US012809094B2

(12) United States Patent
You et al.

(10) Patent No.: US 12,809,094 B2
(45) Date of Patent: Nov. 24, 2026

(54) SPATIOTEMPORAL CONTROL OF LIGHT PROPOGATING THROUGH A FIBER

(71) Applicant: Massachusetts Institute of Technology, Cambridge, MA (US)

(72) Inventors: Sixian You, Cambridge, MA (US); Tong Qiu, Cambridge, MA (US); Honghao Cao, Cambridge, MA (US); Kunzan Liu, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 268 days.

(21) Appl. No.: 18/678,655

(22) Filed: May 30, 2024

(65) Prior Publication Data

US 2024/0402435 A1 Dec. 5, 2024

Related U.S. Application Data

(60) Provisional application No. 63/470,554, filed on Jun. 2, 2023.

(51) Int. Cl.
*G02B 6/35* (2006.01)

(52) U.S. Cl.
CPC .......... *G02B 6/359* (2013.01); *G02B 6/3588* (2013.01)

(58) Field of Classification Search
CPC .................................................. G02B 6/3588
USPC .......................................................... 385/25
See application file for complete search history.

(56) References Cited

U.S. PATENT DOCUMENTS

| | | | | |
|---|---|---|---|---|
| 6,445,844 | B1 * | 9/2002 | Neukermans | G02B 26/0841 385/33 |
| 6,694,072 | B1 * | 2/2004 | Neukermans | G02B 6/32 385/16 |
| 9,329,416 | B2 * | 5/2016 | Regelman | G02F 1/035 |
| 10,054,735 | B2 * | 8/2018 | Yin | C30B 19/12 |
| 2016/0369400 | A1 * | 12/2016 | Maxwell | D01F 8/18 |
| 2018/0239154 | A1 * | 8/2018 | Martinsen | G02B 6/0008 |
| 2022/0069537 | A1 * | 3/2022 | Travers | G02F 1/3528 |
| 2022/0074051 | A1 * | 3/2022 | Maxwell | C04B 35/58028 |

FOREIGN PATENT DOCUMENTS

| | | | |
|---|---|---|---|
| CA | 2072831 C | * | 8/1999 |

OTHER PUBLICATIONS

Moussa et al., "Spatiotemporal beam self-cleaning for high-resolution nonlinear fluorescence imaging with multimode fiber"; Scientific Reports; Sep. 2021; 8 pages.

(Continued)

*Primary Examiner* — Kaveh C Kianni
(74) *Attorney, Agent, or Firm* — Daly, Crowley, Mofford & Durkee, LLP

(57) ABSTRACT

Described herein is an apparatus comprising a base, one or more stands disposed on the base, wherein the stands comprise one or more movement mechanisms configured to move the stands; and one or more translating units disposed on the one or more stands, wherein the one or more translating units comprise a fiber holder. In some embodiments, the one or more translating units are configured to receive and shape a fiber to control spatial degrees of freedom and temporal degrees of freedom of light propagating through the fiber. In some embodiments, each of the one or more translating units can be moved along an x-axis, a y-axis, or a z-axis to manipulate the fiber.

20 Claims, 12 Drawing Sheets

(56) References Cited

OTHER PUBLICATIONS

Sun et al., "Multimode soliton collisions in graded-index optical fibers"; Optics Express, vol. 30, No. 12; Jun. 2022; 15 pages.
Livet et al., "Transgenic strategies for combinatorial expression of fluorescent proteins in the nervous system"; Nature, vol. 450; Nov. 2007; 8 pages.
You et al., "Intravital imaging by simultaneous label-free autofluorescence-multiharmonic microscopy"; Nature Communications; May 2018; 9 pages.
Wright et al., "Multimode Nonlinear Fiber Optics: Massively Parallel Numerical Solver, Tutorial, and Outlook"; IEEE Journal of Selected Topics in Quantum Electronics, vol. 24, No. 3; May-Jun. 2018; 16 pages.
Wu et al., "Highly multimode solitons in step-index optical fiber"; APL Photonics, vol. 8; Sep. 2023; 8 pages.
Demas et al., "Free-space beam shaping for precise control and conversion of modes in optical fiber"; Optics Express, vol. 23, No. 22; Oct. 2015; 15 pages.
Xu et al., "Measurement of two-photon excitation cross sections of molecular fluorophores with data from 690 to 1050 nm"; J. Optical Society of America, vol. 13, No. 3; Mar. 1996; 11 pages.
Ferraro et al., "Multiphoton ionization of standard optical fibers"; Photonics Research, vol. 10, No. 6; May 2022; 7 pages.
Krupa et al., "Multimode nonlinear fiber optics, a spatiotemporal avenue"; APL Photonics, vol. 4; Nov. 2019; 44 pages.
Wright et al., "Physics of highly multimode nonlinear optical systems"; Nature Physics, vol. 18; Sep. 2022; 13 pages.
Krupa et al., "Observation of Geometric Parametric Instability Induced by the Periodic Spatial Self-Imaging of Multimode Waves"; Physical Review Letters 116; May 2016; 5 pages.
Krupa et al., "Spatiotemporal light-beam compression from nonlinear mode coupling"; Physical Review A97; Apr. 2018; 6 pages.
Leventoux et al., "3D time-domain beam mapping for studying nonlinear dynamics in multimode optical fibers"; Optics Letters, vol. 46, No. 1; Jan. 2021; 4 pages.
Shalaby et al., "Visible Supercontinuum Generation by Dual-Wavelength Pumping in Multimode Rectangular Optical Fibers"; Optical Society of America; 2014; 2 pages.
Zhou et al., "Half mJ Supercontinuum Generation in a Telecommunication Multimode Fiber by a Q-switched Tm, Ho:$YVO_4$ Laser"; Journal of the Optical Society of Korea, vol. 19, No. 1; Feb. 2015; 6 pages.
Lopez-Galmiche et al., "Visible supercontinuum generation in a graded index multimode fiber pumped at 1064 nm"; Optics Letters, vol. 41, No. 11; Jun. 2016; 4 pages.
Krupa et al., "Spatiotemporal characterization of supercontinuum extending from the visible to the mid-infrared in a multimode graded-index optical fiber"; Optics Letters, vol. 41, No. 24; Dec. 2016; 4 pages.
Xiong et al., "Spatiotemporal Control of Light Transmission through a Multimode Fiber with Strong Mode Coupling"; Physical Review Letters 117; Jul. 2016; 5 pages.
Redding et al., "All-fiber spectrometer based on speckle pattern reconstruction"; Optical Society of America; Mar. 2013; 17 pages.
Xiong et al., "Deep learning of ultrafast pulses with a multimode fiber"; APL Photonics; Sep. 2020; 10 pages.
Berti et al., "Interplay of thermalization and strong disorder: Wave turbulence theory, numerical simulations, and experiments in multimode optical fibers"; arXiv:2207.08680v1; Jul. 2022; 12 pages.
Bender et al., "Spectral speckle customization"; Optica, vol. 10, No. 10; Oct. 2023; 9 pages.
Shekel et al., "Shaping single photons through multimode optical fibers using mechanical perturbations"; APL Photonics 8; Sep. 2023; 7 pages.
Perret et al., "Supercontinuum generation by intermodal four-wave mixing in a step-index few-mode fibre"; APL Photonics 4; Dec. 2018; 8 pages.
Cao et al., "Controlling light propagation in multimode fibers for imaging, spectroscopy, and beyond"; Advances in Optics and Photonics, vol. 15, No. 2; Jun. 2023; 89 pages.
Carpenter et al., "Degenerate Mode-Group Division Multiplexing"; Journal of Lightwave Technology, vol. 30, No. 24; Dec. 2012; 7 pages.
Ferraro et al., "Femtosecond nonlinear losses in multimode optical fibers"; Photonics Research, vol. 9, No. 12; Dec. 2021; 11 pages.
Poletti et al., "Description of ultrashort pulse propagation in multimode optical fibers"; J. Optical Society of America; Sep. 2008; 10 pages.
Renninger et al., "Optical solitons in graded-index multimode fibres"; Nature Communications; Apr. 2013; 6 pages.
Pourbeyram et al., "Stimulated Raman scattering cascade spanning the wavelength range of 523 to 1750 nm using a graded-index multimode optical fiber"; arXiv:1301.6203v2; Jul. 2013; 4 pages.
Picozzi et al., "Nonlinear virtues of multimode fibre"; Nature Photonics, vol. 9; May 2015; 3 pages.
Wright et al., "Self-organized instability in graded-index multimode fibres"; Nature Photonics, vol. 10; Nov. 2016; 29 pages.
Koehl et al., "Automated spatial and temporal shaping of femtosecond pulses"; Optics Communications 157; Dec. 1998; 5 pages.
Wright et al., "Nonlinear multimode photonics: nonlinear optics with may degrees of freedom"; Optica, vol. 9, No. 7; Jul. 2022; 18 pages.
Liu et al., "Kerr self-cleaning of femtosecond-pulsed beams in graded-index multimode fiber"; Optics Letters, vol. 41, No. 16; Aug. 2016; 4 pages.
Krupa et al., "Spatial beam self-cleaning in multimode fibres"; Nature Photonics, vol. 11; Mar. 2017; 8 pages.
Ahsan et al., "Graded-index solitons in multimode fibers"; Optics Letters, vol. 43, No. 14; Jul. 2018; 4 pages.
Rishoj et al., "Soliton self-mode conversion: revisiting Raman scattering of ultrashort pulses"; Optica, vol. 6, No. 3; Mar. 2019; 5 pages.
Agrawal, "Invite paper: Self-imaging in multimode graded-index fibers and its impact on the nonlinear phenomena"; Optical Fiber Technology 50; May 2019; 8 pages.
Eftekhar et al., "Accelerated nonlinear interactions in graded-index multimode fibers"; Nature Communications; Apr. 2019; 10 pages.
Wright et al., "Spatiotemporal mode-locking in multimode fiber lasers"; Science, vol. 358, No. 6359; Oct. 2017; 58 pages.
Qin et al., "Observation of soliton molecules in a spatiotemporal mode-locked multimode fiber laser"; Optics Letters, vol. 43, No. 9; May 2018; 4 pages.
Tegin et al., "Spatiotemporal self-similar fiber laser"; Optica, vol. 6, No. 11; Nov. 2019; 4 pages.
Wei et al., "Harnessing a multi-dimensional fibre laser using genetic wavefront shaping"; Light: Science & Applications 9; Aug. 2020; 10 pages.
Ding et al., "Spatiotemporal mode-locking in lasers with large modal dispersion"; Physical Review Letters 126; Mar. 2021; 29 pages.
Vaughan et al., "Automated two-dimensional femtosecond pulse shaping"; Journal Optical Society of America, vol. 19, No. 10; Oct. 2002; 7 pages.
Garnier et al., Wave condensation with weak disorder vs beam self-cleaning in multimode fibers; arXiv:2011.03918v1; Nov. 2020; 34 pages.
Podivilov et al., "Hydrodynamic 2D Turbulence and Spatial Beam Condensation in Multimode Optical Fibers"; Physical Review Letters 122; Mar. 2019; 6 pages.
Tegin et al., "Scalable optical learning operator"; Nature Computational Science, vol. 1, No. 8; Aug. 2021; 10 pages.
Rahmani et al., "Learning to image and compute with multimode optical fibers"; Nanophotonics 2022 11(6); Jan. 2022; 12 pages.
Mussot et al., "Generation of a broadband single-mode supercontinuum in a conventional dispersion-shifted fiber by use of a subnanosecond microchip laser"; Optics Letters, vol. 28, No. 19; Oct. 2003; 3 pages.
Cheng et al., "Intermodal Cerenkov radiation in a higher-order-mode fiber"; Optics Letters, vol. 37, No. 21; Nov. 2012; 4 pages.
Demas et al., "Intermodal nonlinear mixing with Bessel beams in optical fiber"; Optica, vol. 2, No. 1; Jan. 2015; 4 pages.

(56) References Cited

OTHER PUBLICATIONS

Nazemosadat et al., "Phase matching for spontaneous frequency conversion via four-wave mixing in graded-index multimode optical fiber"; Journal of the Optical Society of America B, vol. 33, No. 2; Feb. 2016; 7 pages.
Wang et al., "Advanced Fiber Soliton Sources for Nonlinear Deep Tissue Imaging in Biophotonics"; IEEE Journal of Selected Topics in Quantum Electronics, vol. 20, No. 2; Mar.-Apr. 2014; 11 pages.
Xu et al., "Recent Advances in Fiber Lasers for Nonlinear Microscopy"; Nat Photonics; Nov. 2013; 17 pages.
Lefort, "A review of biomedical multiphoton microscopy and its laser sources"; Journal of Physics D: Applied Physics 00; Jul. 2017; 18 pages.
Wright et al., "Controllable spatiotemporal nonlinear effects in multimode fibers"; Nature Photonics, vol. 9; May 2015; 5 pages.
Eftekhar et al., "Versatile supercontinuum generation in parabolic multimode optical fibers"; Optics Express, vol. 25, No. 8; Apr. 2017; 10 pages.
Xu et al., "Multiphoton Excitation of Molecular Fluorophores and Nonlinear Laser Microscopy"; Topics in Fluorescence Spectroscopy, vol. 5; 1997; 70 pages.
Yildirim et al., "Functional imaging of visual cortical layers and subplate in awake mice with optimized three-photon microscopy"; Nature Communications; Jan. 2019; 12 pages.
Tzang et al., "Adaptive wavefront shaping for controlling nonlinear multimode interactions in optical fibres"; Nature Photonics, vol. 12; Jun. 2018; 8 pages.
Deliancourt et al., "Wavefront shaping for optimized many-mode Kerr beam self-cleaning in graded-index multimode fiber"; Optics Express, vol. 27, No. 12; Jun. 2019; 11 pages.
Tegin et al., "Controlling spatiotemporal nonlinearities in multimode fibers with deep neural networks"; APL Photonics, vol. 5; Mar. 2020; 8 pages.
Resisi et al., "Wavefront shaping in multimode fibers by transmission matrix engineering"; APL Photonics, vol. 5; Mar. 2020; 8 pages.
Zach et al., "All-fiber widely tunable ultrafast laser source for multimodal imaging in nonlinear microscopy"; Optics Letters, vol. 44, No. 21; Nov. 2019; 4 pages.
Rishoj et al., "Jitter-free, dual-wavelength, ultrashort-pulse, energetic fiber sources using soliton self-mode conversion"; Optics Express, vol. 28, No. 3; Feb. 2020; 7 pages.
Finkelstein et al., "Spectral shaping in a multimode fiber by all-fiber modulation"; APL Photonics, vol. 8; Mar. 2023; 7 pages.
Eslami et al., "Two octave supercontinuum generation in a non-silica graded-index multimode fiber"; Nature Communications; Apr. 2022; 10 pages.
Snyder, "Coupled-Mode Theory for Optical Fibers"; Journal of the Optical Society of America, vol. 62, No. 11; Nov. 1972; 11 pages.
Marcuse, "Coupled Mode Theory of Round Optical Fibers"; American Telephone and Telegraph Company, vol. 52, No. 6; Jul.-Aug. 1973; 26 pages.
Wright et al., "Spatiotemporal dynamics of multimode optical solitons"; Optics Express; Optical Society of America; Feb. 2015; 15 pages.
Eftekhar et al., "General theory and observation of Cherenkov radiation induced by multimode solitons"; Communications Physics; Jun. 2021; 7 pages.
Zitelli et al., "Multimode solitons in step-index fibers"; Optics Express, vol. 30, No. 4; Feb. 2022; 11 pages.
Dubietis et al., "Ultrafast supercontinuum generation in bulk condensed media (Invited Review)"; arXiv:1706.04356v1; Jun. 2017; 34 pages.
Kubat et al., "Multimode supercontinuum generation in chalcogenide glass fibres"; Optics Express; Optical Society of America; Feb. 2016; 14 pages.
Gaeta, "Catastrophic Collapse of Ultrashort Pulses"; Physical Review Letters, vol. 84, No. 16; Apr. 2000; 4 pages.
Horak et al., "Multimode Nonlinear Fibre Optics: Theory and Applications"; University of Southampton; 2012; 22 pages.
Dong et al., "Characterizing point spread functions of two-photon fluorescence microscopy in turbid medium"; Journal of Biomedical Optics, vol. 8, No. 3; Jul. 2003; 10 pages.
Xiao et al., "Theory of intermodal four-wave mixing with random linear mode coupling in few-mode fibers"; Optics Express; Optical Society of America; Dec. 2014; 21 pages.
Bendahmane et al., "Seeded intermodal four-wave mixing in a highly multimode fiber"; Journal of the Optical Society of America B, vol. 35, No. 2; Feb. 2018; 7 pages.
Mumtaz et al., "Nonlinear Propagation in Multimode and Multicore Fibers: Generalization of the Manakov Equations"; Journal of Lightwave Technology, vol. 31, No. 3; Feb. 2013; 9 pages.
Petersen et al., "Mid-infrared supercontinuum covering the 1.4-13.3 μm molecular fingerprint region using ultra-high NA chalcogenide step-index fibre"; Nature Photonics, vol. 8; Nov. 2014; 6 pages.
Yariv, "Coupled-Mode Theory for Guided-Wave Optics"; IEEE Journal of Quantum Electronics, vol. QE-9, No. 9; Sep. 1973; 15 pages.
Olshansky, "Mode Coupling Effects in Graded-Index Optical Fibers"; Applied Optics, vol. 14, No. 4; Apr. 1975; 11 pages.
Caravaca-Aguirre et al., "Single multimode fiber endoscopy"; Optics Express, vol. 25, No. 3; Feb. 2017; 10 pages.
Flaes et al., "Robustness of Light-Transport Processes to Bending Deformations in Graded-Index Multimode Waveguides"; Physical Review Letters 120; Jun. 2018; 5 pages.
Lancry et al., "Dependence of the femtosecond laser refractive index change thresholds on the chemical composition of doped-silica glasses"; Optical Materials Express, vol. 1, No. 4; Optical Society of America; Jul. 2011; 13 pages.
Ramsay et al., "Generation of infrared supercontinuum radiation: spatial mode dispersion and higher-order mode propagation in ZBLAN step-index fibers"; Optics Express, vol. 21, No. 9; Apr. 2013; 8 pages.
Huland et al., "Three-photon excited fluorescence imaging of unstained tissue using a Grin lens endoscope"; Biomedical Optics Express, vol. 4, No. 5; Apr. 2013; 7 pages.
Choe et al., "Intravital three-photon microscopy allows visualization over the entire depth of mouse lymph nodes"; Nature Immunology, vol. 23; Feb. 2022; 27 pages.
Hoover et al., "Advances in multiphoton microscopy technology"; Nature Photonics, vol. 7; Feb. 2013; 9 pages.
Debarre et al., "Mitigating Phototoxicity during Multiphoton Microscopy of Live *Drosophila* Embryos in the 1.0-1.2 μm Wavelength Range"; PLOS ONE, vol. 9, Issue 8; Aug. 2014; 12 pages.

* cited by examiner

SPATIOTEMPORAL CONTROL OF LIGHT PROPOGATING THROUGH A FIBER

CROSS-REFERENCE SECTION

This application claims the benefit of U.S. Provisional Application No. 63/470,554, filed Jun. 2, 2023. The entire contents of this application is incorporated herein by reference.

STATEMENT REGARDING FEDERALLY SPONSORED RESEARCH

N/A

BACKGROUND

A multimode spatiotemporal light field propagating in an optical multimode fiber (MMF) may be controlled by adjusting an input wavefront to graded-index (GRIN) MMFs for selective mode excitation at the fiber input. In particular, such selective mode excitation has been achieved by adjusting the intensity field distribution launched into the fiber and thus controlling the pulse propagation in GRIN MMFs from the spatial degrees of freedom. Spatial pulse control used in conventional systems and methods for controlling light propagating in an MMF have drawbacks due to at least two limitations: (1) difficulty of controlling the output spatiotemporal pulses; and (2) limited broadband brightness of the output pulses.

SUMMARY

Disclosed herein is an apparatus. According to one aspect of the disclosure, the apparatus comprises a base, one or more stands disposed on the base, wherein the stands comprise one or more movement mechanisms configured to move the stands, and one or more translating units disposed on the one or more stands. In some embodiments, the one or more translating units comprise a fiber holder. In some embodiments, the one or more translating units are configured to receive and shape a fiber to control spatial degrees of freedom and temporal degrees of freedom of light propagating through the fiber.

In some embodiments, each of the one or more translating units can be moved along an x-axis, a y-axis, or a z-axis to manipulate the fiber. In some embodiments, each of the one or more of the translating units are positioned differently along the x-axis, the y-axis, or the z-axis compared to each other. In some embodiments, each of the one or more translating units are positioned the same along the x-axis, the y-axis, and the z-axis compared to each other. In some embodiments, there are five or seven translating units. In some embodiments, the one or more translating units are actuators. In some embodiments, the one or more movement mechanisms comprise one or more of a gear, a motor, or a screw. In some embodiments, the fiber holder further comprises two disks, wherein each of the disks has a curved surface with a radii that may be adjusted to preset a minimum bend radius applied to the fiber. In some embodiments, the bend radius of the fiber is about 5 mm to about 10 mm. In some embodiments, the apparatus further comprises one or more caps configured to receive and hold the fiber in the apparatus.

According to one aspect of the disclosure, a method of manipulating a fiber comprises providing a base, providing one or more stands disposed on the base. In some embodiments, the stands comprise one or more movement mechanisms configured to move the stands. In some embodiments, the method comprises providing one or more translating units disposed on the one or more stands. In some embodiments, the one or more translating units comprise a fiber holder. In some embodiment, the one or more translating units are configured to receive and shape a fiber to control spatial degrees of freedom and temporal degrees of freedom of light propagating through the fiber.

In some embodiments, the method further comprises moving each of the one or more translating units along an x-axis, a y-axis, or a z-axis to manipulate the fiber. In some embodiments, the method further comprises moving each of the one or more of the translating units to a different position along the x-axis, the y-axis, or the z-axis compared to each other. In some embodiments, the method further comprises moving each of the one or more of the translating units to the same position along the x-axis, the y-axis, or the z-axis compared to each other. In some embodiments, there are five or seven translating units. In some embodiments, the one or more translating units are actuators. In some embodiments, the one or more movement mechanisms comprise one or more of a gear, a motor, or a screw. In some embodiments, the fiber holder further comprises two disks, wherein each of the disks has a curved surface with a radii that may be adjusted to preset a minimum bend radius applied to the fiber. In some embodiments, the bend radius of the fiber is about 5 mm to about 10 mm. In some embodiments, the method further comprises providing one or more caps configured to receive and hold the fiber.

DESCRIPTION OF THE SEVERAL VIEWS OF THE DRAWINGS

The manner and process of making and using the disclosed embodiments may be appreciated by reference to the figures of the accompanying drawings. It should be appreciated that the components and structures illustrated in the figures are not necessarily to scale, emphasis instead being placed upon illustrating the principles of the concepts described herein. Like reference numerals designate corresponding parts throughout the different views. Furthermore, embodiments are illustrated by way of example and not limitation in the figures, in which.

DETAILED DESCRIPTION

In general overview, disclosed herein is an apparatus (which may be referred to herein as a fiber shaper) and method for spatiotemporal control of nonlinear pulse propagation in a multimode fiber. The apparatus applies multipoint bending (e.g., macrobending at axially dispersed positions) to a fiber to impart various bending radii to the fiber and thereby alter the multimode spatial interactions at various points along the pulse temporal evolution. The macrobending applied to the fiber alters the local refractive index profile, which alters the energy coupling between the modes during the propagation of light through the fiber. This manipulation enables spatiotemporal control, meaning control of the spatial degrees of freedom and temporal degrees of freedom, of nonlinear pulse propagation through the fiber.

Figure 1A:
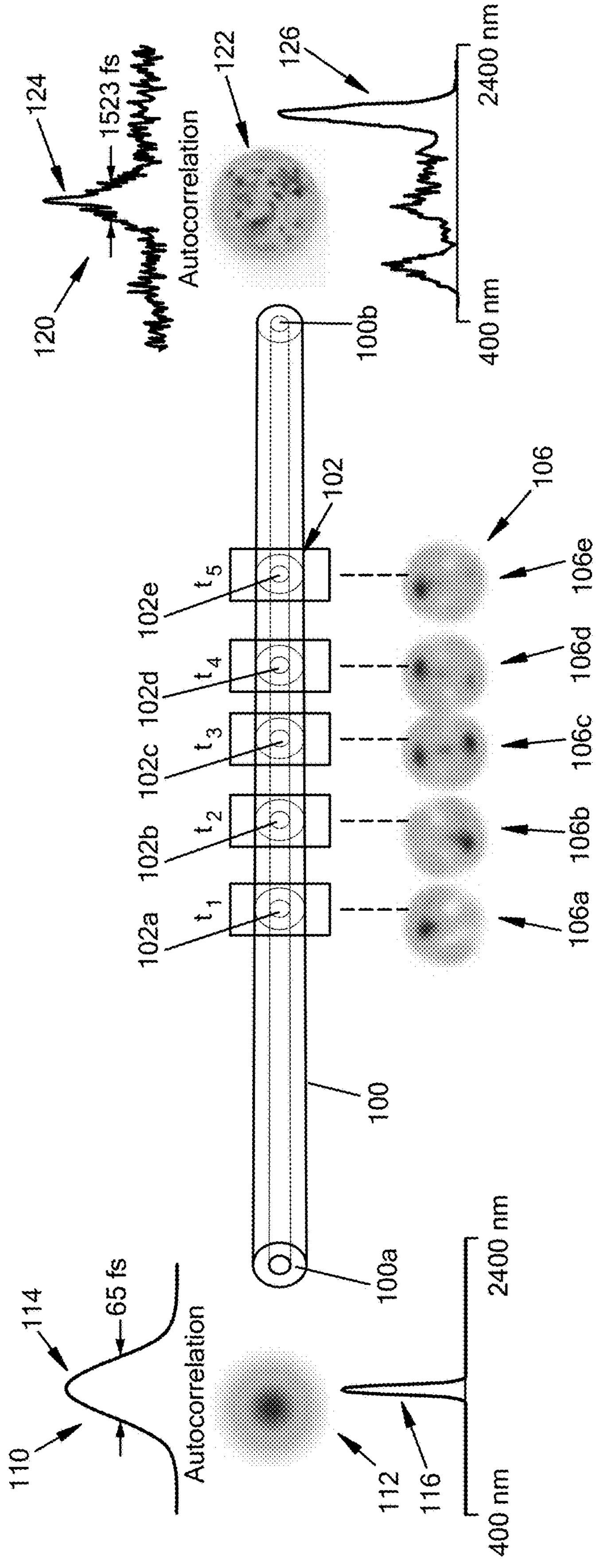
FIG. 1A is a side transparent view of a fiber.
Figure 1B:
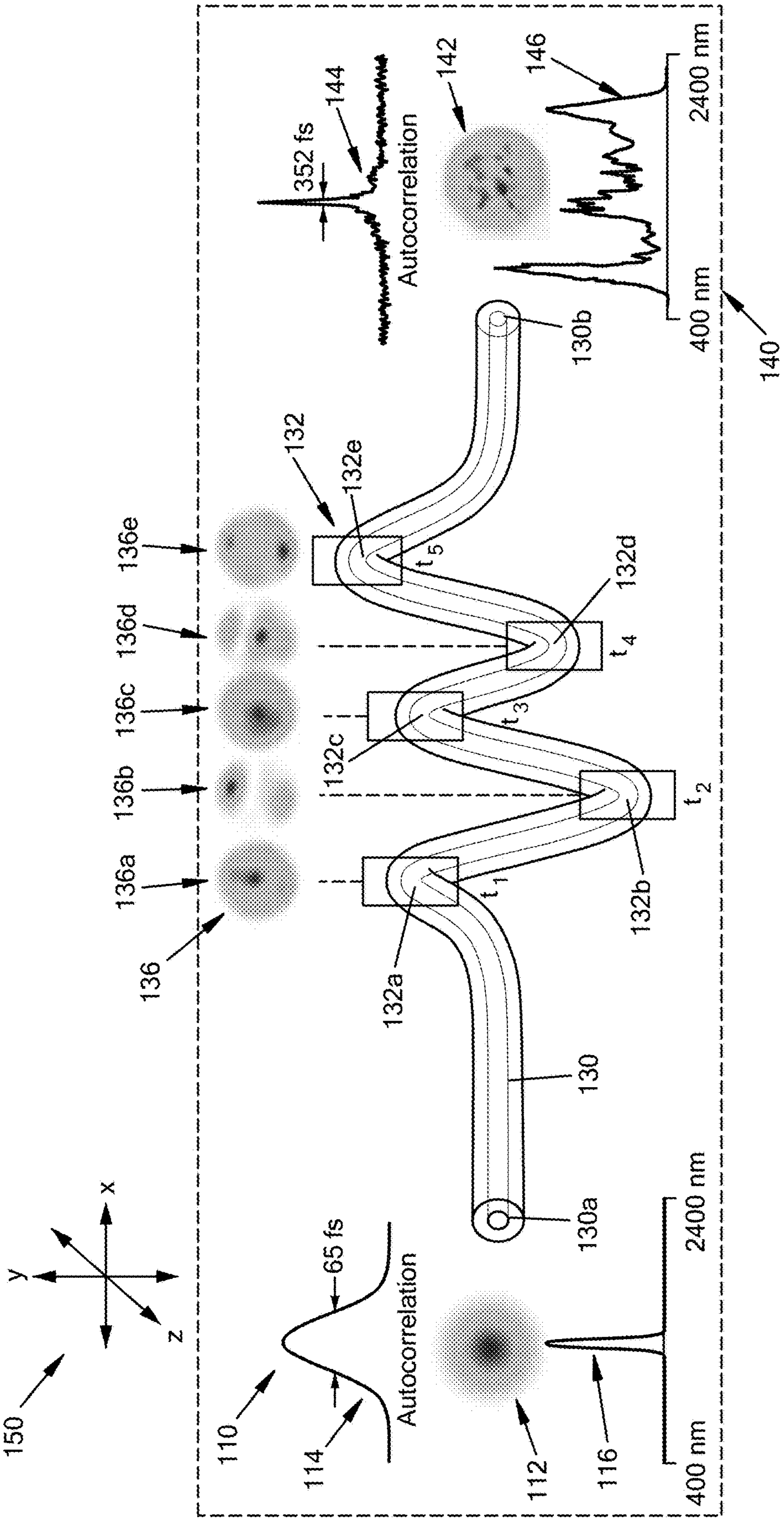
FIG. 1B is a side transparent view of a multimode fiber manipulated to provide spatiotemporal control of nonlinear pulse propagation therein.

Referring now to FIGS. 1A and 1B in which like elements are provided having like reference designations, FIG. 1A illustrates an unmanipulated multimode fiber 100 as having a substantially linear shape (linear may be referred to herein as straight). With a substantially linear shape, fiber 100 has certain characteristics. Consequently, a pulse of light propagating along fiber 100 also has certain characteristics as the light pulse propagates from a first end 100*a* to a second end 100*b* of the fiber 100. For example, a light pulse of a propagating mode provided to a first end 100*a* of fiber 100 has a spatial structure (i.e., spatial intensity profile) as illustrated by reference numeral 112, a wavelength spectrum (which may be referred to herein as an input spectrum) illustrated by curve 116 and an intensity autocorrelation characteristic (the intensity autocorrelation characteristic may be referred to herein as an autocorrelation signal (a.u.) or an input pulse duration) illustrated by curve 114. The wavelength spectrum illustrates intensity vs. wavelength along the 400 nm to 2400 nm spectrum. The intensity autocorrelation illustrates autocorrelation signal vs. time in femtoseconds (fs). In this example, intensity autocorrelation curve 114 has a width of 65 fs. The 65 fs was measured at full width at half maximum (FWHM).

The fiber 100 has different locations designated by reference numerals 102*a*-102*e* (or more simply locations 102) from the first end 100*a* to the second end 100*b*. As illustrated in FIG. 1A, pulse 112 propagates along unmanipulated multimode fiber 100 from the first end 100*a* to the second end 100*b* and at different points in time $t_1$-$t_5$ and different locations 102*a*-102*e* has respective ones of spatial structures designated by reference numerals 106*a*-106*e* (or more simply spatial intensity profiles 106).

The pulse propagates through fiber 100 and at a first point in time $t_1$ at a first location 102*a* of the fiber has a spatial intensity profile designated by reference numeral 106*a*. The pulse propagates through fiber 100 and at a second point in time $t_2$ at a second location 102*b* of the fiber has a spatial intensity profile designated by reference numeral 106*b*. The pulse propagates through fiber 100 and at a third point in time $t_3$ at a third location 102*c* has a spatial intensity profile designated by reference numeral 106*c*. The pulse propagates through fiber 100 and at a fourth point in time $t_4$ at a fourth location 102*d* has a spatial intensity profile designated by reference numeral 106*d*. The pulse propagates through fiber 100 and at a fifth point in time $t_5$ at a fifth location 102*e* has a spatial intensity profile designated by reference numeral 106*e*.

At the second end 100*b* of the linear multimode fiber 100, the light pulse has a spatial structure (i.e., spatial intensity profile) designated by reference numeral 122. The output light pulse also has a wavelength spectrum (which may be referred to herein as an output spectrum) illustrated by curve 126 and an intensity autocorrelation characteristic (which may be referred to herein as an output pulse duration) illustrated by curve 124. The wavelength spectrum illustrates intensity vs. wavelength along the 400 nm to 2400 nm spectrum. The intensity autocorrelation illustrates autocorrelation signal vs. time in fs. In this example, it can be seen that intensity autocorrelation curve 124 has a width of 1523 fs. The 1523 fs was measured at FWHM. The output spectrum illustrated by curve 126 is significantly broader than the input spectrum illustrated by curve 116 due to nonlinear effects resulting in spectral broadening. The output pulse duration illustrated by curve 124, which is proportional to the autocorrelation signal width, is much broader than the input pulse duration illustrated by curve 114 due to dispersion effects as well as the nonlinear effects.

FIG. 1B illustrates a multimode fiber 130 as having a manipulated (non-straight or non-linear) shape. With a manipulated shape, fiber 130 has certain characteristics. Consequently, a pulse of light propagating along fiber 130 also has certain characteristics as the light pulse propagates from a first end 130*a* to a second end 130*b* of the fiber 130. For example, a pulse of a propagating mode provided to a first end 130*a* of fiber 100 has a spatial structure (i.e., spatial intensity profile) as illustrated by reference numeral 112.

The input pulse, which here is the same as the input pulse in FIG. 1A, has a wavelength spectrum illustrated by curve 116 and an intensity autocorrelation characteristic illustrated by curve 114. In this example, intensity autocorrelation curve 114 has a width of 65 fs.

The fiber 130 has different locations given by reference numeral 132*a*-132*e* (or more simply locations 132) from the first end 130*a* to second end 130*b*. The pulse 112 propagates along manipulated multimode fiber 130 from the first end 130*a* to the second end 130*b* and at different points in time $t_1$-$t_5$ has respective ones of spatial structures as illustrated by reference numerals 136*a*-136*e* (or more simply spatial intensity profiles 136).

The pulse propagates through fiber 130 and at a first point in time $t_1$ at a first location 132*a* has a spatial intensity profile designated by reference numeral 136*a*. The pulse propagates through fiber 130 and at a second point in time $t_{12}$ at a second location 132*b* has a spatial intensity profile designated by reference numeral 136*b*. The pulse propagates through fiber 130 and at a third point in time $t_3$ at a third location 132*c* has a spatial intensity profile designated by reference numeral 136*c*. The pulse propagates through fiber 130 and at a fourth point in time $t_4$ at a fourth location 132*d* has a spatial intensity profile designated by reference numeral 136*d*. The pulse propagates through fiber 130 and at a fifth point in time $t_5$ at a fifth location 132*e* has a spatial intensity profile designated by reference numeral 136*e*.

The fiber 130 has manipulations (e.g., bends or curves of various radii) at the locations 132, that is fiber 130 has been mechanically manipulated by imparting controlled bends and stresses in the fiber 130, enabling spatiotemporal control of the light propagation. The bends at locations 132*a*-132*e* can be produced along an x-axis, a y-axis, or a z-axis (in a Cartesian coordinate system or radial distance r, polar angle θ (theta), and azimuthal angle φ (phi) in a spherical coordinate system) (axis 150 is shown in FIG. 1B for reference). Each of the bends along locations 132 may be the same or different compared to the other locations 132. For example, the bend at the second location 132*b* is at a different location along the x-axis and y-axis compared to the bend at the first location 132*a*.

The bends have a radii, the bending radii alters the local refractive index profile of the fiber 130. Altering the local refractive index profile alters the propagation of the pulse through the fiber 130, enabling spatiotemporal control. The bend radius of the fiber 130 may range from about 5 mm (+/−0.1 mm) to about 10 mm (+/−0.1 mm). In embodiments, a minimum bend radius may be about 10 mm (+/−0.1 mm), to minimize bending-induced transmission loss introducing an appropriate level of change to the local refractive index. Generally, the smaller the bending radii, the higher the transmission loss and the higher the degree of manipulation. Herein, the 10 mm translation range with a 10 mm contact radius is chosen empirically to balance the transmission loss and degree of control.

Manipulation by bending the fiber 130 at locations 132 enables flexible tunability through spatiotemporal control of the multimode nonlinear effect. The spectral tunability factor is defined as the ratio of the maximally enhanced intensity to the maximally suppressed intensity for each spectral band. The respective points in time $t_1$-$t_5$ correlate to respective points in time $t_1$-$t_5$ in FIG. 1A.

Accordingly, the spatial intensity profiles 136 and spatial intensity profiles 106 illustrate the spatiotemporal control exhibited in the manipulated fiber 130. As can be seen in FIG. 1B, the output light pulse also has a wavelength spectrum (which may be referred to herein as an output spectrum) illustrated by curve 146 and an intensity autocorrelation characteristic (which may be referred to herein as an output pulse duration) illustrated by curve 144. The wavelength spectrum illustrates intensity vs. wavelength along the 400 nm to 2400 nm spectrum. The intensity autocorrelation illustrates autocorrelation signal vs. time in fs. In this example, it can be seen that intensity autocorrelation curve 144 has a width of 352 fs. The 352 fs was measured at FWHM.

The output spectrum illustrated by curves 126, 146 is significantly broader than the input spectrum illustrated by curve 116 due to nonlinear effects resulting in spectral broadening. However, the shape of the output spectra illustrated by curve 146 is noticeably different compared to the shape of the output spectrum illustrated by curve 126, resulting from the spatiotemporal control of the nonlinear pulse propagation. Accordingly, the difference between the curves 126, 146 illustrates how the disclosed method can control the output pulse in the spectral domain.

In reference to the temporal domain, in the output pulse duration illustrated by curve 144 there is noticeable temporal broadening compared to the input pulse duration illustrated by curve 114, arising from dispersion and nonlinear effects. In comparing the output pulse duration illustrated by curve 144 to the output pulse duration illustrated by curve 124, the pulse duration is significantly reduced, suggesting that the disclosed methods can control the output light fields in the temporal domain, and more specifically, can reduce the output pulse duration, which is preferred in the vast majority of applications.

The spatiotemporal control is further illustrated by the spatial intensity profile 112 of the input pulse and the spatial intensity profile 142 of the output pulse. At the second end 130*b* of the linear multimode fiber 130, the light pulse has a spatial structure (i.e., spatial intensity profile) as illustrated by reference numeral 142. The spatial intensity profile 142 is speckled and features multiple modal components, which is the spatial signature of light out of an MMF. The spatial intensity profile 142 and the spatial intensity profile 112 illustrate different spatial profiles signifying different modal compositions, which demonstrates the spatial shaping aspect of the fiber shaper. For example, comparing spatial intensity profile 142 and spatial intensity profile 122, it can be seen that spatial intensity profile 142 is less speckled than spatial intensity profile 122 using the disclosed methods, and a less speckled spatial field is in general preferred. Accordingly, the disclosed methods can control the output pulses in the spatial domain.

Figure 2:
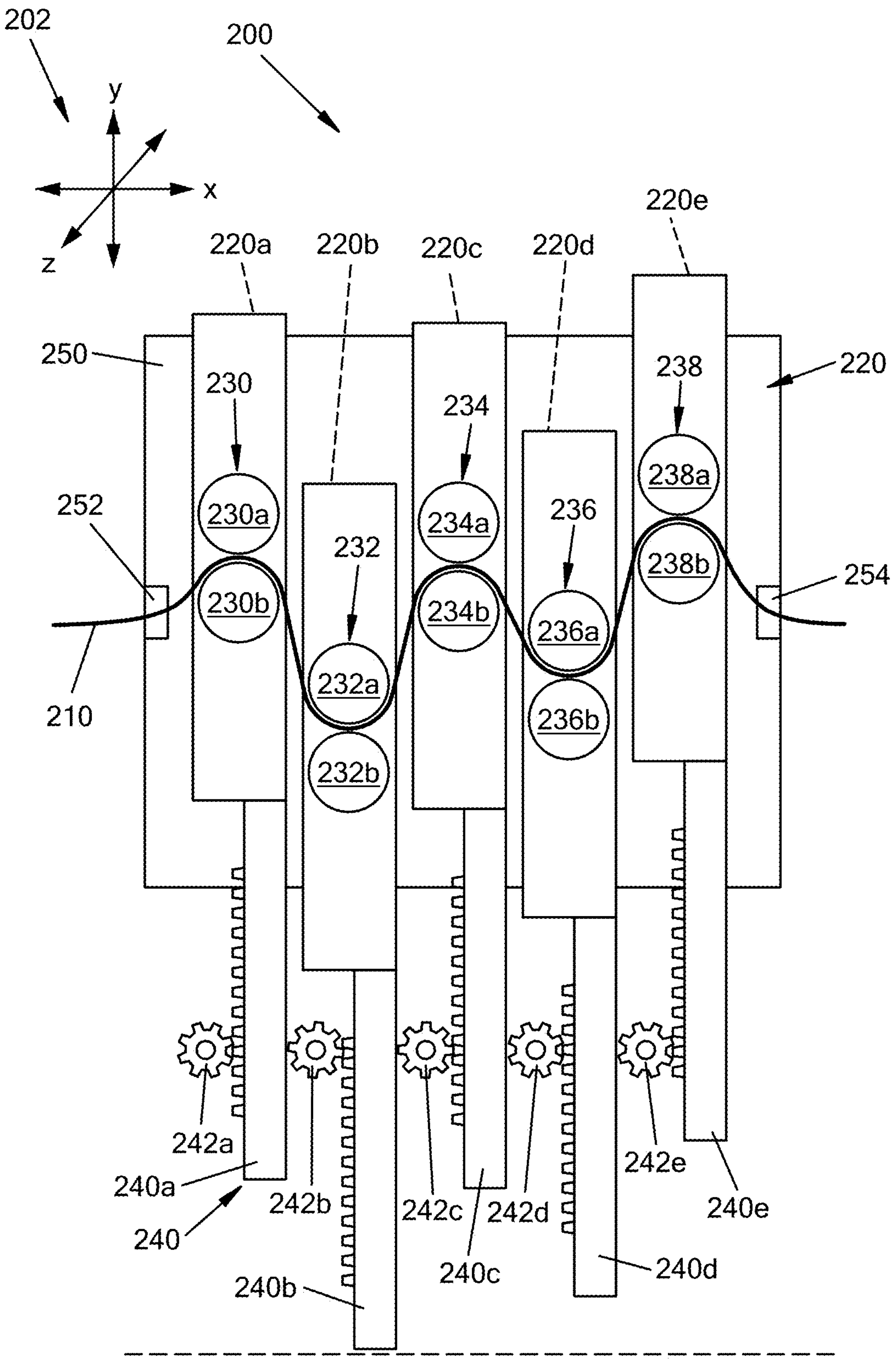
FIG. 2 is a front view of a conceptual example apparatus capable of manipulating a fiber, such as the fiber of FIG. 1A.
Figure 3:
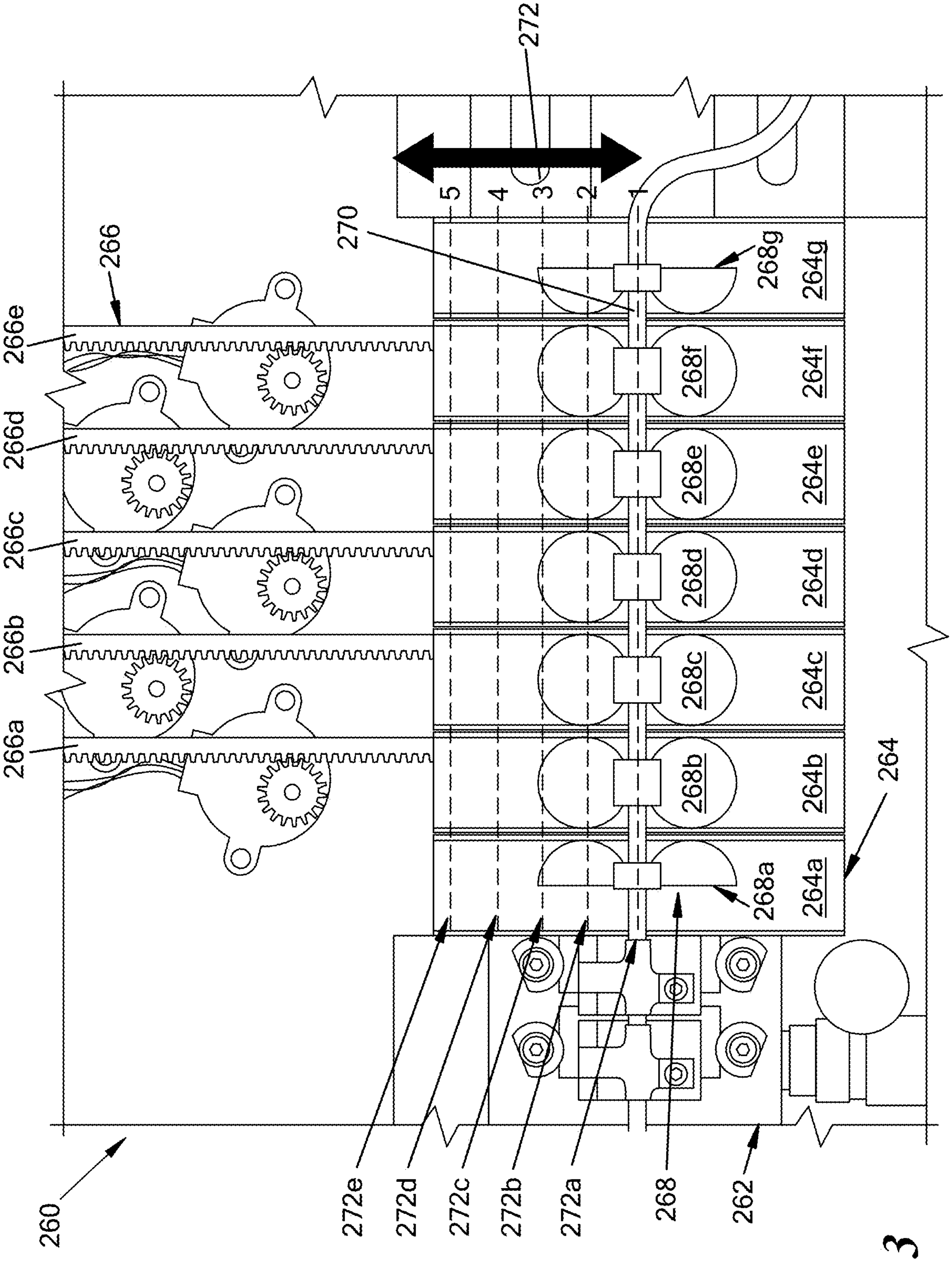
FIG. 3 is a front view of an alternative actual example apparatus capable of manipulating a fiber, such as the fiber of FIG. 1A.
Figure 4:
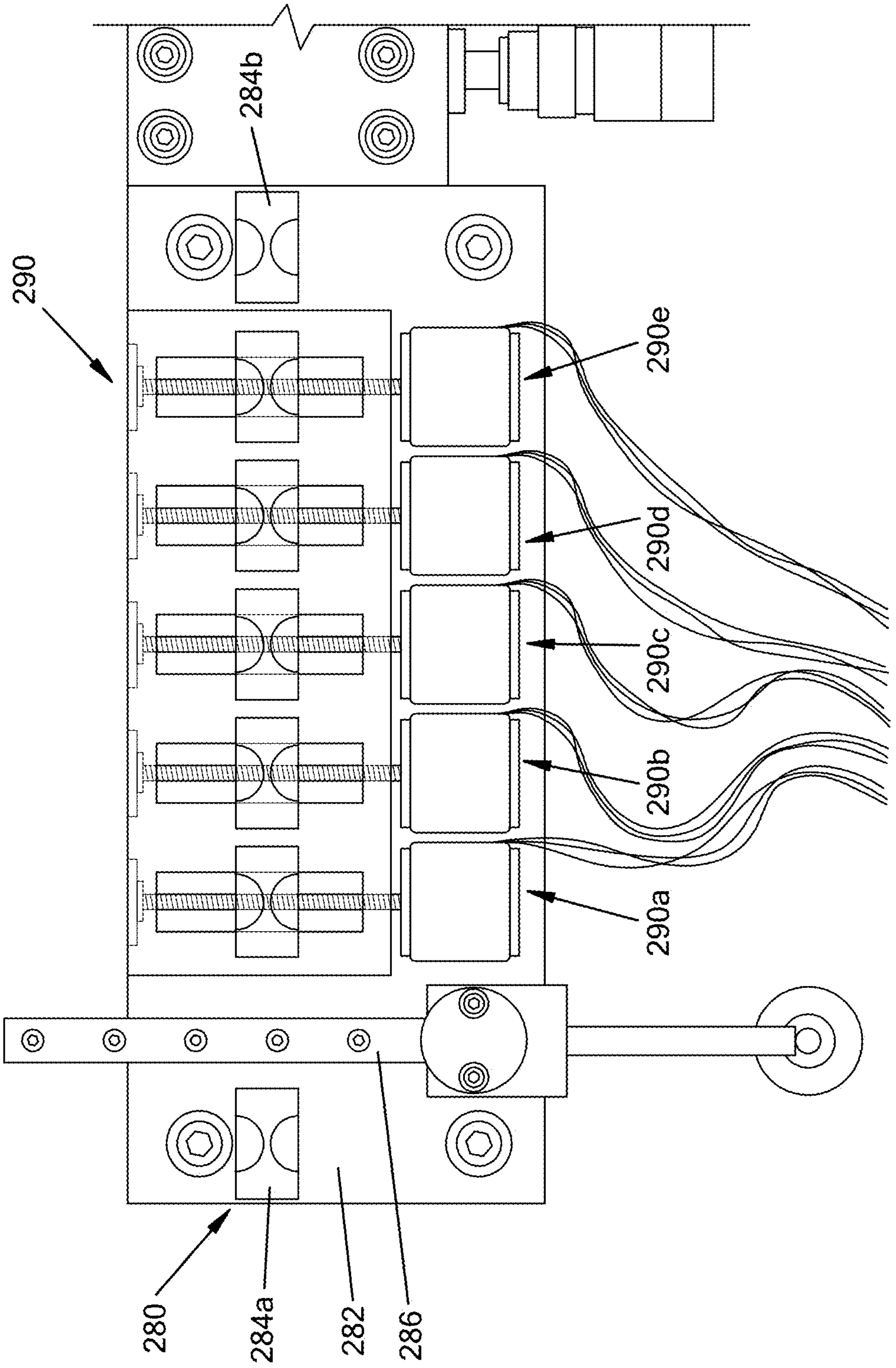
FIG. 4 is a front view of an alternative actual apparatus capable of manipulating a fiber, such as the fiber of FIG. 1A.

FIG. 2-4 illustrate various apparatuses for manipulating a fiber, such as fibers 110, 130 of FIGS. 1A, 1B.

Referring now to FIG. 2, an apparatus 200 (which may be referred to herein is a fiber shaper) capable of manipulating a fiber 210 includes a base 250 upon which translating units 220*a*, 220*b*, 220*c*, 220*d*, 220*e*, generally denoted 220 (or more simply translating units 220) are disposed. The translating units 220 are configured to receive and shape the fiber 210 to control spatial degrees of freedom and temporal degrees of freedom of light propagating through the fiber 210. Fiber 210 may be the same as or similar to fibers 110, 130 of FIGS. 1A, 1B.

Translating units 220 are disposed on stands 240*a*, 240*b*, 240*c*, 240*d*, 240*e*, generally denoted 240 (or more simply stands 240) disposed on the base 250. The stands 240 comprise one or more gears (which may be referred to herein as movement mechanisms) 242*a*, 242*b*, 242*c*, 242*d*, 242*e* configured to move the stands 240. A first translating unit 220*a* is disposed on a first stand 240*a* with a first gear 242*a* adjacent to a second translating unit 220*b*. The second translating unit 220*b* is disposed on a second stand 240*b* with a second gear 242*b* adjacent to the first translating unit 220*a* and a third translating unit 220*c*. The third translating unit 220*c* is disposed on a third stand 240*c* with a third gear 242*c* adjacent to the second translating unit 220*b* and a fourth translating unit 220*d*. The fourth translating unit 220*d* is disposed on a fourth stand 240*d* with a fourth gear 242*d* adjacent to the third translating unit 220*c* and a fifth translating unit 220*e*. The fifth translating unit 220*e* is disposed on a fifth stand 240*e* with a fifth gear 242*e* adjacent to the fourth translating unit 220*d*.

The translating units 220 can each individually move in varying direction to manipulate the shape of the fiber 210 and thereby provide the fiber having characteristics selected to control (or manipulate or alter) energy coupling between optical modes at one or more time points during propagation of light through the fiber 210. Each of the translating units 220 can be moved along an x-axis, a y-axis, or a z-axis (axis 202 is shown in FIG. 2 for reference) (e.g., the x-axis, y-axis, or z-axis the in a Cartesian coordinate system or radial distance r, polar angle θ (theta), and azimuthal angle φ (phi) in a spherical coordinate system) to manipulate the fiber 210. Each of the translating units 220 may be positioned differently along the x-axis, the y-axis, or the z-axis compared to each other. Each of the translating units 220 may be positioned the same along the x-axis, the y-axis, and the z-axis compared to each other.

For example, as disclosed in FIG. 2, the first translating unit 220*a* is disposed at a different higher elevation along the y axis compared to the second translating unit 220*b*. The third translating unit 220*c* is positioned at a similar or the same elevation along the y axis compared to the first translating unit 220*a*. The fourth translating unit 220*d* is positioned at an elevation between the second and third translation units 220*b*, 220*c* along the y axis. The fifth translating unit 220*e* is positioned at a higher elevation than the first translating unit 220*a* along the y axis. Accordingly, the translating units 220 can be moved along the vertical axis and the horizontal axis in the direction perpendicular to the optical axis of the fiber 210.

The movement mechanisms to move the translating units 220 comprise one or more of a gear, a motor, or a screw. The translating units 220 further comprise one or more motors configured to power (and move) the translating units and one or more processors configured to control the translating units 220. While five translating units are shown, other configurations are possible. There may be five or seven translating units. For example, there may be two, four, seven, or eight translating units. The translating units 220 may be actuators. In the embodiment, each translating unit is powered by its own stepper motor (ELEGOO 28BYJ-48) through a three dimensional (3D)-printed rack and pinion system, allowing for individual control over their linear motion through a microcontroller (ELEGOO Mega R3) that communicates with a computer.

Each translating unit comprise a fiber holder. The fiber holder comprises two disks, configured to receive the fiber 210. The fiber 210 is inserted into the translating units 220 through the fiber holders. Each of the disks has a curved surface with a radii that may be adjusted to control a minimum bend radius of the fiber 210. Each of the disks has a curved surface with a radii that may be adjusted in the design phase to preset (or control) a minimum bend radius applied to the fiber 210. The position of the disk pair can be adjusted to control a bend radius of the fiber 210. The first and second disks each have a curved surface that imparts a bending radii onto the fiber 210.

In the embodiment shown in FIG. 2, the first translating unit 220*a* includes a first fiber holder 230 with a first disk 230*a* and a second disk 230*b*. The second translating unit 220*b* includes a second fiber holder 232 with a first disk 232*a* and a second disk 232*b*. The third translating unit 220*c* includes a third fiber holder 234 with a first disk 234*a* and a second disk 234*b*. A fourth translating unit 220*d* includes a fourth fiber holder 236 with a first disk 236*a* and a second disk 236*b*. A fifth translating unit 220*e* includes a fifth fiber holder 238 with a first disk 238*a* and a second disk 238*b*. The gap between the two disks is 0.5 mm.

The radii of the curved surface of the holder may be adjusted in order to control the minimum bend radius of the fiber. The radius of the disk determines the minimum bend radius the apparatus can apply. Macro-bending of various radii can be applied to the fiber both precisely and simultaneously, allowing for an exhaustive automated search and adaptive optimization of thousands of fiber shape configurations to achieve optimal output spectral-temporal-spatial properties. The radii of each disk may be the same or different. The radius of the disk is about 5 mm (+/−0.1 mm) to about 10 mm (+/−0.1 mm). In embodiments, the radius of the disk is about 10 mm (+/−0.1 mm), to minimize bending-induced transmission loss. Laser cutting may be used to fabricate the fiber holder, which reduces fabrication time.

One or more caps are configured to receive and hold the fiber 210 in the apparatus 200. A cap may be disposed or otherwise positioned where the fiber 210 enters and exits the apparatus 200 to hold the fiber 210. A first cap 252 is disposed opposite a second cap 254 on the base 250. The caps 252, 254 are configured to receive and hold the fiber 210 in the apparatus 200. The cap is optional, one or two caps may or may not be used. The cap may be a square or rectangular shape. Two half-disks with securing caps may be disposed at the entrance and exit of the apparatus to ensure optimal functionality.

FIG. 2 illustrates an example embodiment of the apparatus, which was fabricated using 3D printing with acrylonitrile styrene acrylate material. Comprising five 3D printed translating units and 1 processor, in addition to the other parts, the apparatus is low cost, making it an accessible and open-source tool for nonlinear and linear modulation of MMFs. Different device parameters were tested to optimize the spectral tunability of the fiber shaper. Additionally, real-time feedback from a spectrometer, autocorrelator, and camera may be integrated into the apparatus to enable real-time feedback to optimize the control process and enable adaptive fiber shaping.

FIG. 3 is a front view of an apparatus 260 capable of manipulating a fiber 270. The apparatus 260 includes a base 262 upon which translating units 264*a*, 264*b*, 264*c*, 264*d*, 264*e*, 264*f*, 264*g*, generally denoted 264 (or more simply translating units 264) are disposed. The translating units 264 are configured to receive and shape the fiber 270 to control spatial degrees of freedom and temporal degrees of freedom of light propagating through the fiber. The translating units 264 may be individually moved to arrange the fiber 270 in different positions 272*a*, 272*b*, 272*c*, 272*d*, 272*e*, generally denoted 272 (or more simply positions 272).

A first translating unit 264*a* is disposed on the base 262 adjacent to a second translating unit 264*b*. The second translating unit 264*b* is disposed on the base 262 adjacent to a third translating unit 264*c*. The third translating unit 264*c* is disposed on the base 262 adjacent to a fourth translating unit 264*d*. The fourth translating unit 264*d* is disposed on the base 262 adjacent to a fifth translating unit 264*e*. The fifth translating unit 264*e* is disposed on the base 262 adjacent to a sixth translating unit 264*f*. The sixth translating unit 264*f* is disposed on the base 262 adjacent to a seventh translating unit 264*g*.

Each translating unit 264 comprise a fiber holder 268*a*, 268*b*, 268*c*, 268*d*, 268*e*, 268*f*, 268*g*, generally denoted 268 (or more simply fiber holders 268) comprising a first and second disk configured to receive the fiber 270 (fiber holders 268 may be similar to or the same as t e fiber holders disclosed in FIG. 2). A first fiber holder 268*a* is disposed on the first translating unit 264*a* adjacent to the second translating unit 264*b*. A second fiber holder

268*b* is disposed on the second translating unit 264*b* adjacent to the third translating unit 264*c*. A third fiber holder 268*c* is disposed on the third translating unit 264*c* adjacent to the fourth translating unit 264*d*. A fourth fiber holder 268*d* is disposed on the fourth translating unit 264*d* adjacent to the fifth translating unit 264*e*. A fifth fiber holder 268*e* is disposed on the fifth translating unit 264*e* next to the sixth translating unit 264*f*. A sixth fiber holder 268*f* is disposed on the sixth translating unit 264*f* adjacent to the fifth translating unit 264*e*. A seventh fiber holder 268*g* is disposed on the seventh translating unit 264*g*.

Translating units 264 are disposed on stands 266*a*, 266*b*, 2466*c*, 266*d*, 266*e*, generally denoted 266 (or more simply stands 266) disposed on the base 262. The second translating unit 264*b* is disposed on a first stand 266*a*. The third translating unit 264*c* is disposed on the second stand 266*b* adjacent to the first stand 266*a*. The fourth translating unit 264*d* is disposed on the third stand 266*c* adjacent to the second stand 266*b*. The fifth translating unit 264*e* is disposed on a fourth stand 266*d* adjacent to the third stand 266*c*. The sixth translating unit 264*f* is disposed on a fifth stand 266*e* adjacent to the fourth stand 266*d*. The stands 266 include gears disposed on the stands 266 enabling further control over the movement of the stands 266 and translating units 264.

The stands 226 may be used to move the translating units 264 such that the fiber is arranged in any one of the positions 272, for example the fiber 270 may be moved to: a first position 272*a*; a second position 272*b*; a third position 272*c*; a fourth position 272*d*; and/or a fifth position 272*e*. While five positions 272 are shown, more or less are possible. Each or all of the translating units can be moved to any of the positions 272. Accordingly, one or all of the translating units may be disposed such that the fiber 270 is at any one of the positions 272. For example, the first stand 266*a* and the second stand 266*b* may be moved such that the second translating unit 264*b* and the third translating unit 264*c* arranges the fiber 270 in the second position 272*b*, while the other translating units remain in the first position 272*a*. One, two, three, four, five, six, or all of translating units 264 may be moved to orient the fiber 270 at different positions 272. Some or all of the positions 272 may be the same or different.

FIG. 4 is a front view of an apparatus 280 capable of manipulating a fiber (not shown). As opposed to a gear-rack motion translation platform, the apparatus 280 utilizes linear actuators with lead screws, which have increased precision and improved repeatability. The apparatus 280 includes a base 282 upon which translating units 290*a*, 290*b*, 290*c*, 290*d*, 290*e*, generally denoted 290 (or more simply translating units 290) are disposed. A stand 286 is disposed adjacent to the translating units 290, to support movement and control of the translating units and the fiber.

The translating units 290 are configured to receive and shape the fiber and may be individually moved to arrange the fiber 270 in different positions. A first translating unit 290*a* is disposed on the base 282 adjacent to the stand 286. A second translating unit 290*b* is disposed on the base 282 adjacent to the first translating unit 290*a*. A third translating unit 290*c* is disposed on the base 282 adjacent to the second translating unit 290*b*. A fourth translating unit 290*d* is disposed on the base 282 adjacent to the third translating unit 290*c*. A fifth translating unit 290*e* is disposed on the base 282 adjacent to the fourth translating unit 290*d*.

A first cap 284*a* is disposed on the base 282 adjacent to the stand 286 on one side of the translating units 290. A second cap 284*b* is disposed on the base 282 on an opposite side of the translation units 290. The caps 284*a*, 284*b* are positioned where the fiber enters and exits the apparatus 280 to hold the fiber.

It should be appreciated that although the fiber shapers described above in conjunction with FIGS. 2-4 illustrate structures and techniques to produce a various number of bends in a fiber (e.g. five (5) bends, there is no specific number or limit to the number of bends which may be provided in a fiber. That is, the present disclosure is not limited to fiber shapers capable of producing a specific number of bends in a fiber. Any number of bends 1–N, where N is an integer greater than 1, may be used. Nor is the present disclosure limited to fiber shapers capable of producing a specific range of bend radii in a fiber. After reading the disclosure provided herein required one of ordinary skill in the art will; appreciate how to select the appropriate number of bends and the appropriate bend radii to suit the needs of a particular application.

Figure 5:
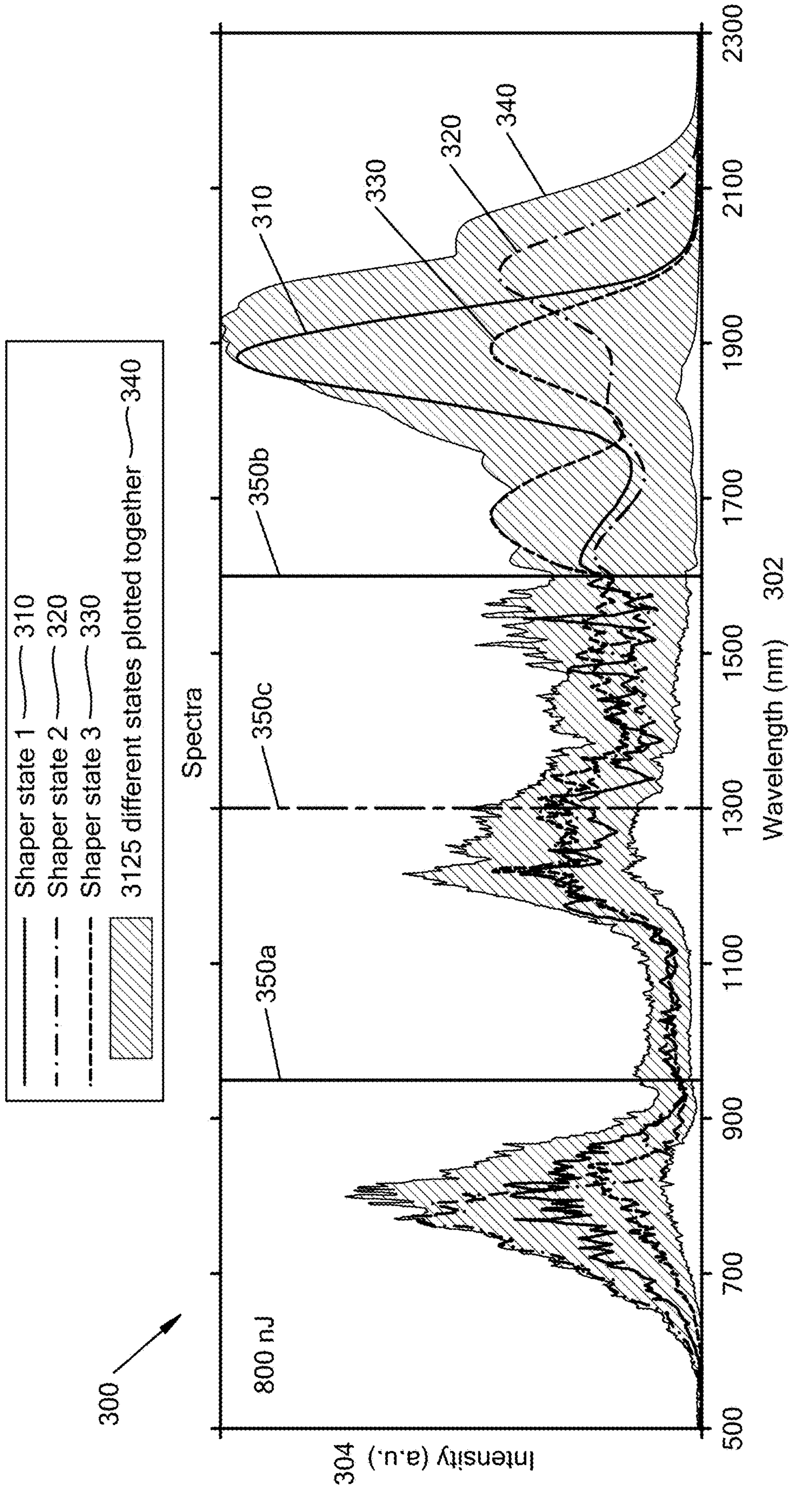
FIG. 5 is a graph of wavelength vs. intensity for a manipulated fiber.

FIG. 5 is a graph 300 of an output spectra of a wavelength (nm) 302 vs. an intensity (a.u.) 304. Graph 300 illustrates the output spectra of experimentally acquired output spectra of a manipulated fiber (specifically a SI MMF), with the same launching condition but different combinations of translating unit positions resulting in different manipulation configurations, including a first configuration (or shaper state 1) 310, a second configuration (or shaper state 2) 320, and a third configuration (or shaper state 3) 330. In total 3125 configurations were tested, with the combination of all 3125 tests are plotted together in shaded area 340. Solid lines, including a first solid line 350*a* and a second solid line 350*b*, mark the spectral range measured by different spectrometers. A dash-dotted line 350*c* denotes the input wavelength.

The graph 300 depicted in FIG. 5 demonstrates the unprecedented broadband spectral brightness. By leveraging the rich spatiotemporal degrees of freedom and the high spectral brightness in SI MMF, the manipulated fiber demonstrates broadband high spectral density averaging at 0.415 nJ/nm across a wide bandwidth 93 from 560 to 2200 nm, femtosecond-level output pulse duration, and great spectral-temporal-spatial tunability is possible. Accordingly, the manipulated fiber confirmed an average of 25-fold (up to 166-fold) enhancement in spectral band energy and up to 4.3-fold reduction in pulse duration. Enabled by the combined spectral and temporal tuning based on the apparatus, the fiber exhibited high peak power levels across the two-octave spectral bands.

Apart from the tunability, it was additionally observed that the GRIN MMFs exhibited a lower threshold for laser-induced damage, compared with SI MMFs. As the input pulse energy was gradually increased (e.g., above 500 nJ) there was an additional decrease in launching efficiency and a reduction in the output spectral span. This lower damage threshold is possibly due to the parabolic index profile which leads to more severe self-focusing effects and the Germanium dopant in the GRIN fiber core.

FIGS. 6A-8D are graphs of an output spectra of a fiber shaped by the apparatus having various different properties. FIGS. 6A-6D depicts graphs of an output spectra of a fiber shaped by an apparatus having a different number of translating units. FIGS. 7A-7D depicts graphs of an output spectra of a fiber shaped by an apparatus having different displacement ranges. The displacement range refers a displacement of the full actuator stage from one side to the other. FIGS. 8A-8D depicts graphs of an output spectra of a fiber shaped by an apparatus having a different number of translating unit motion resolutions. The translating unit motion resolution in an actuator stage refers to the step size used in the testing for the stage motion.

Figure 6A:
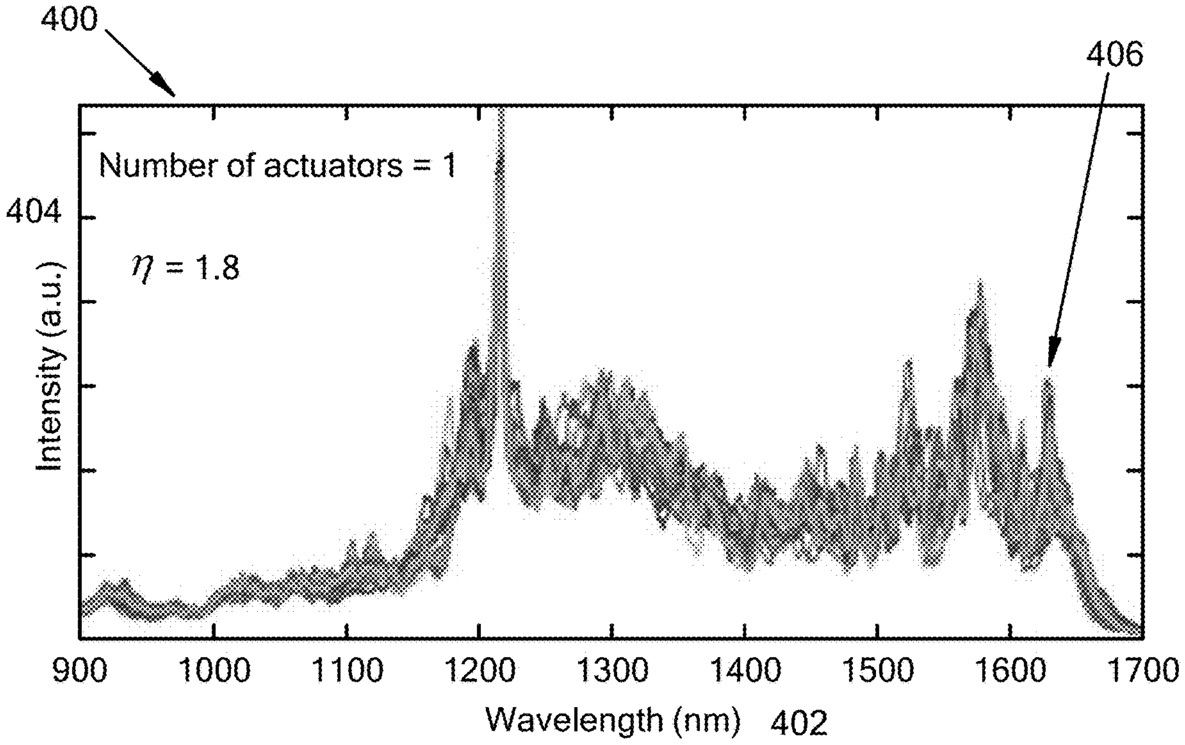
FIG. 6A is a graph of wavelength vs. intensity for a manipulated fiber shaped with an apparatus with one translating unit.
Figure 6B:
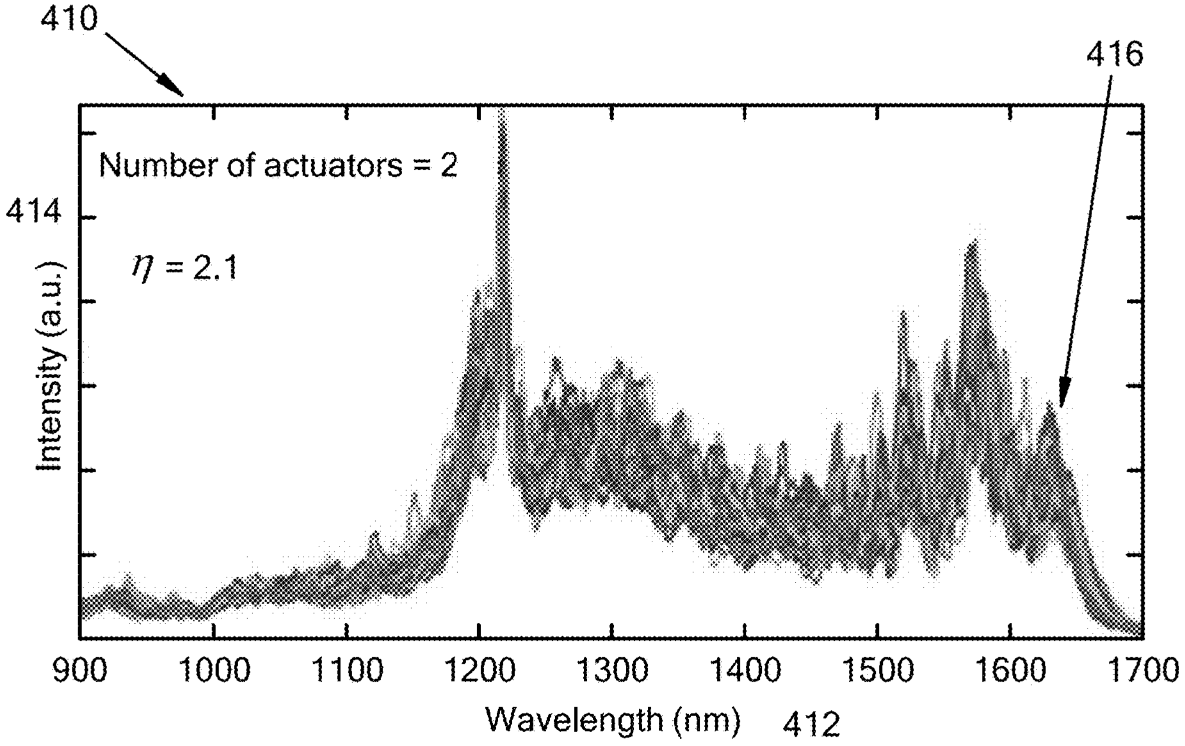
FIG. 6B is a graph of wavelength vs. intensity for a manipulated fiber shaped with an apparatus with two translating units.
Figure 6C:
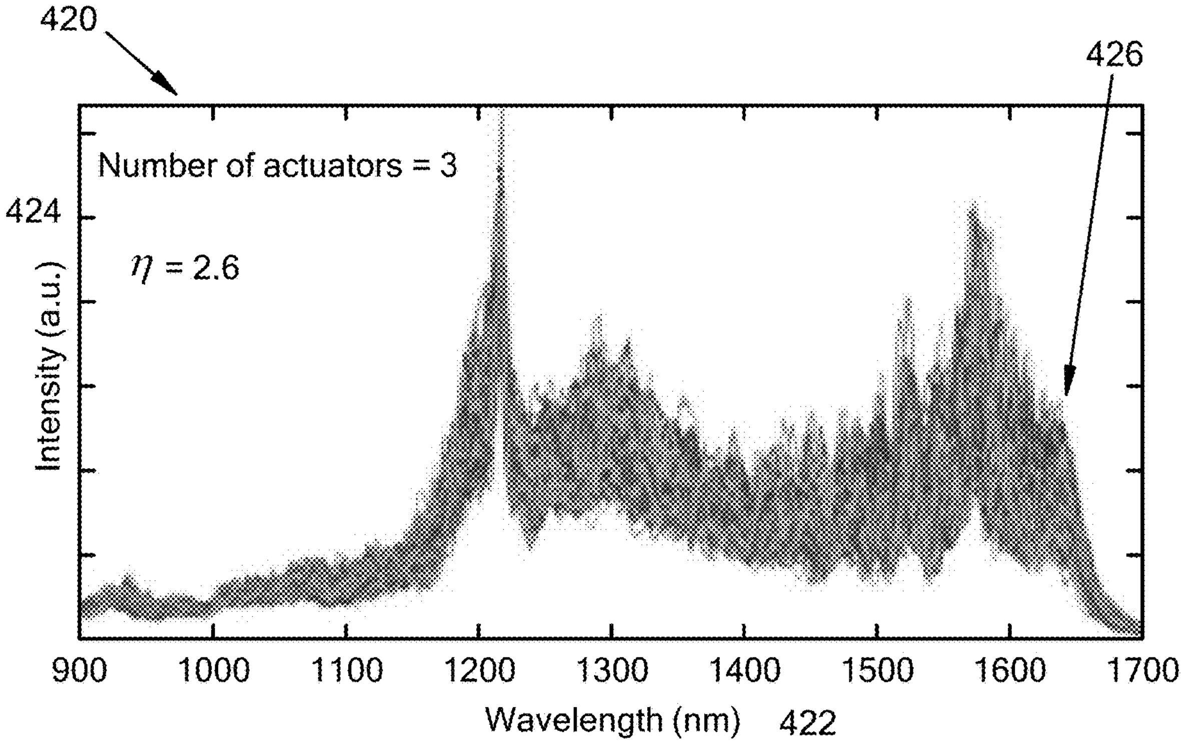
FIG. 6C is a graph of wavelength vs. intensity for a manipulated fiber shaped with an apparatus with three translating units.
Figure 6D:
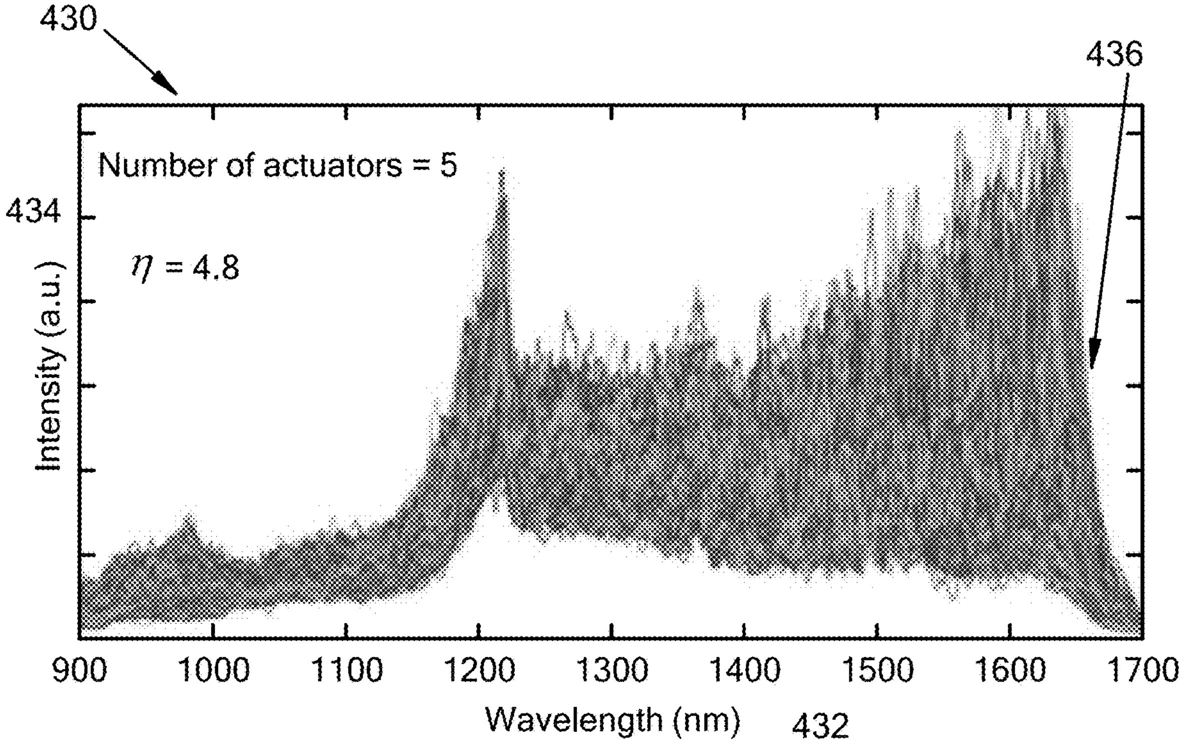
FIG. 6D is a graph of wavelength vs. intensity for a manipulated fiber shaped with an apparatus with five translating units.

FIGS. 6A-6D depict graphs of an output spectra of a manipulated fiber (specifically a SI MMF). FIG. 6A is a graph 400 of wavelength (nm) 402 vs. intensity (a.u.) 404. FIG. 6A illustrates an output spectra 406 of a fiber shaped by an apparatus with 1 translating unit and a resulting average spectral tuning ratio (η) of 1.8, which is defined as $$\eta = \frac{1}{N}\sum_{n=1}^{N} \frac{I_{\lambda_n}^{max}}{I_{\lambda_n}^{min}}$$

wherein N denotes the number of discrete wavelengths acquired by the spectrometers, and $$I_{\lambda_n}^{max} \text{ and } I_{\lambda_n}^{min}$$

refer to the maximum and minimum intensity at each wavelength. FIG. 6B is a graph 410 of wavelength (nm) 412 vs. intensity (a.u.) 414. FIG. 6B illustrates an output spectra 416 of a fiber shaped by an apparatus with 2 translating units and a resulting η of 2.1. FIG. 6C is a graph 420 of wavelength (nm) 422 vs. intensity (a.u.) 424. FIG. 6C illustrates an output spectra 426 of a fiber shaped by an apparatus with 3 translating units and a resulting η of 2.6. FIG. 6D is a graph 430 of wavelength (nm) 432 vs. intensity (a.u.) 434. FIG. 6D illustrates an output spectra 436 of a fiber shaped by an apparatus with 5 translating units and a resulting η of 4.8. The possibility of combinations of translating unit translation displacements create a vast array of fiber shape configurations, allowing for effective utilization of the spatial and temporal degrees of freedom in controlling nonlinear pulse propagation in SI MMFs with high light throughput.

Generally, the spectral tunability increases with an increasing number of actuators. The spectral tunability may approach saturation with a reasonably large amount of actuators, but it calls for a longer fiber which induces undesirable dispersion. Herein, 5 units were chosen based on a balance between the tunability and the dispersion effect. Less or more units may be considered for different applications.

Figure 7A:
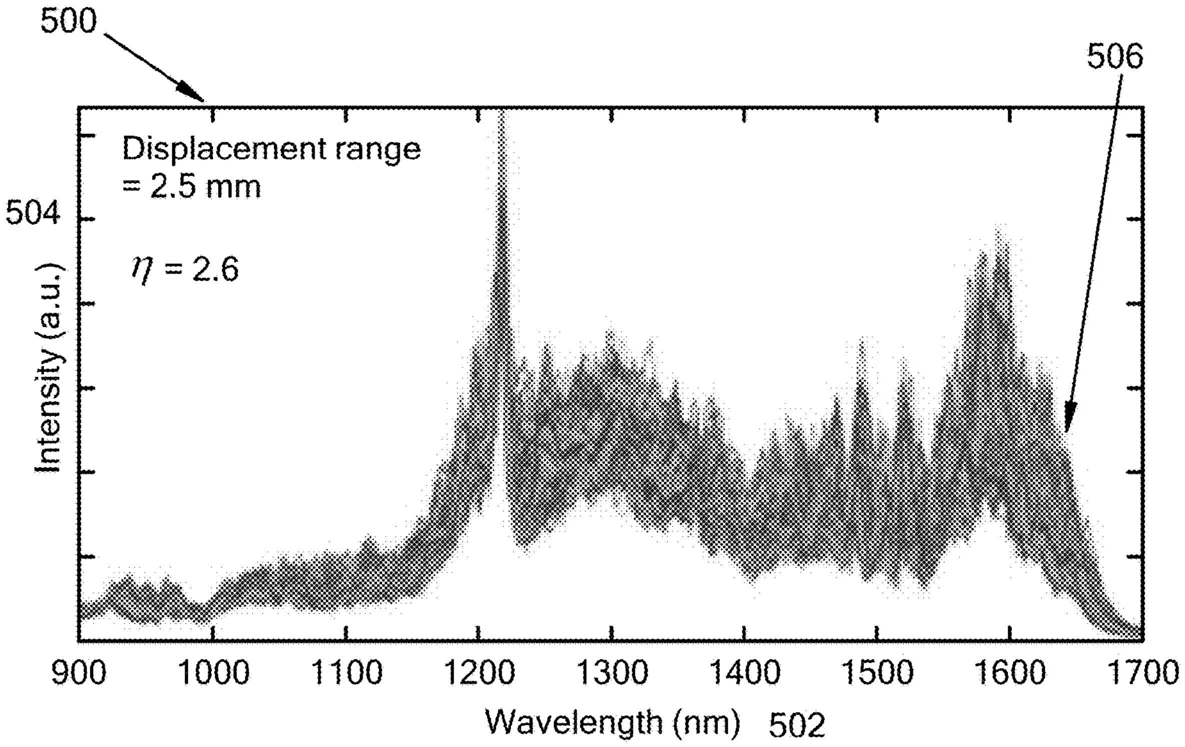
FIG. 7A is a graph of wavelength vs. intensity for a manipulated fiber shaped with an apparatus with a displacement range of 2.5 mm.
Figure 7B:
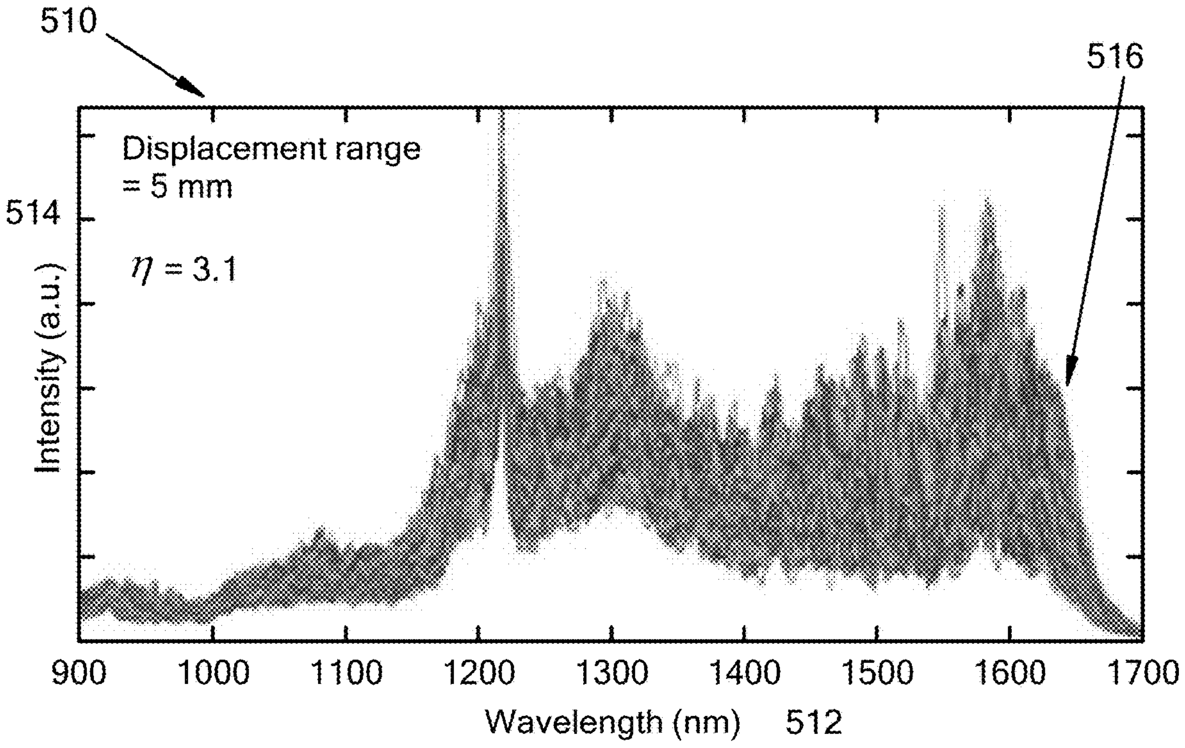
FIG. 7B is a graph of wavelength vs. intensity for a manipulated fiber shaped with an apparatus with a displacement range of 5 mm.
Figure 7C:
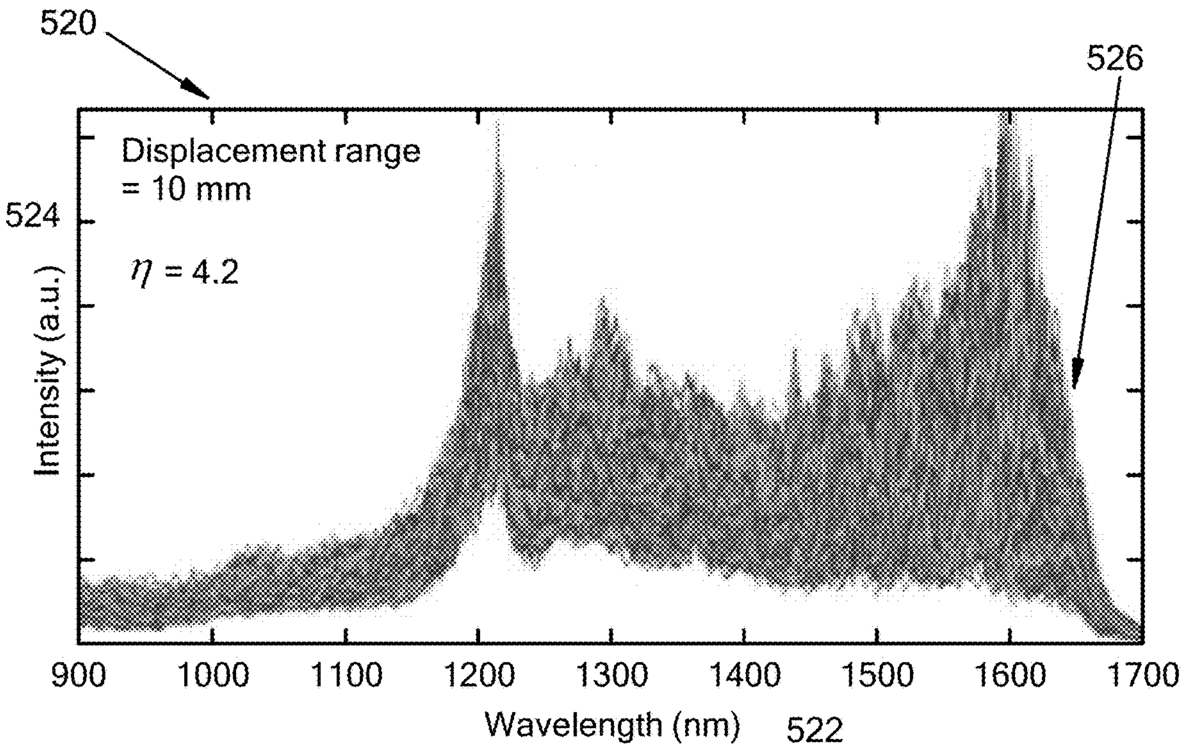
FIG. 7C is a graph of wavelength vs. intensity for a manipulated fiber shaped with an apparatus with a displacement range of 10 mm.
Figure 7D:
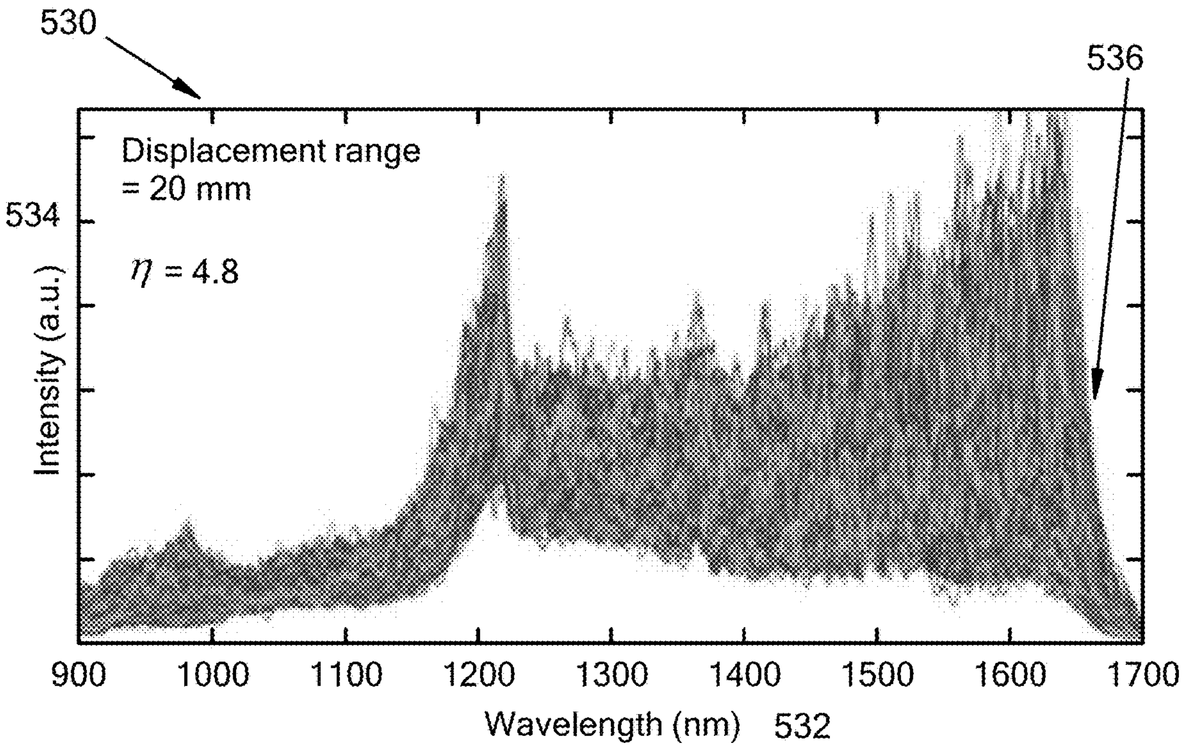
FIG. 7D is a graph of wavelength vs. intensity for a manipulated fiber shaped with an apparatus with a displacement range of 20 mm.

FIG. 7A-7D depict graphs of an output spectra of a manipulated fiber (specifically an MMF fiber) shaped with 5 translating units and a motion resolution of 5 mm. FIG. 7A is a graph 500 of wavelength (nm) 502 vs. intensity (a.u.) 504. FIG. 7A illustrates an output spectra 506 of a fiber shaped by an apparatus with a displacement range of 2.5 mm and a η of 2.6. FIG. 7B is a graph 510 of wavelength (nm) 512 vs. intensity (a.u.) 514. FIG. 7B illustrates an output spectra 516 of a fiber shaped by an apparatus with a displacement range of 5 mm and a η of 3.1. FIG. 7C is a graph 520 of wavelength (nm) 522 vs. intensity (a.u.) 524. FIG. 7C illustrates an output spectra 526 of a fiber shaped by an apparatus with a displacement range of 10 mm and a η of 4.2. FIG. 7D is a graph 530 of wavelength (nm) 532 vs. intensity (a.u.) 534. FIG. 7D illustrates an output spectra 536 of a fiber shaped by an apparatus with a displacement range of 20 mm and a η of 4.8. By increasing the displacement range, the tunability is increased. However, the tunability approaches saturation when it increases to 20 mm.

Figure 8A:
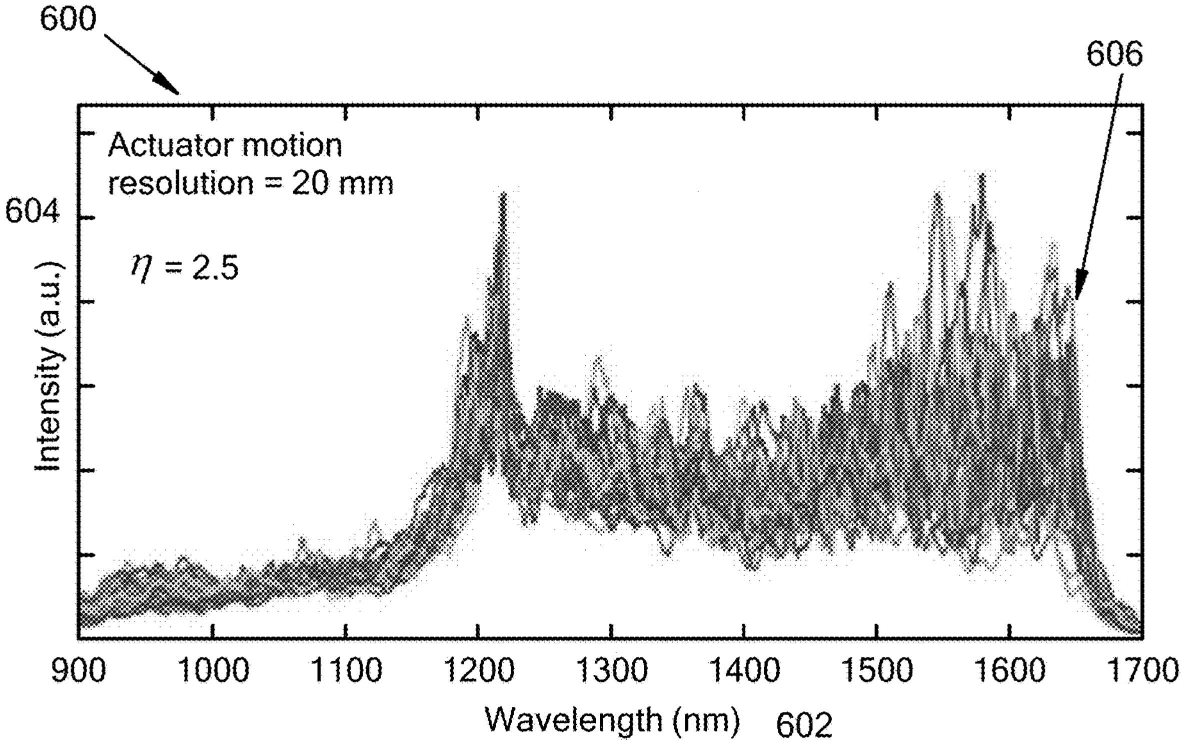
FIG. 8A is a graph of wavelength vs. intensity for a manipulated fiber shaped with an apparatus having a translating unit motion resolution set at 20 mm.
Figure 8B:
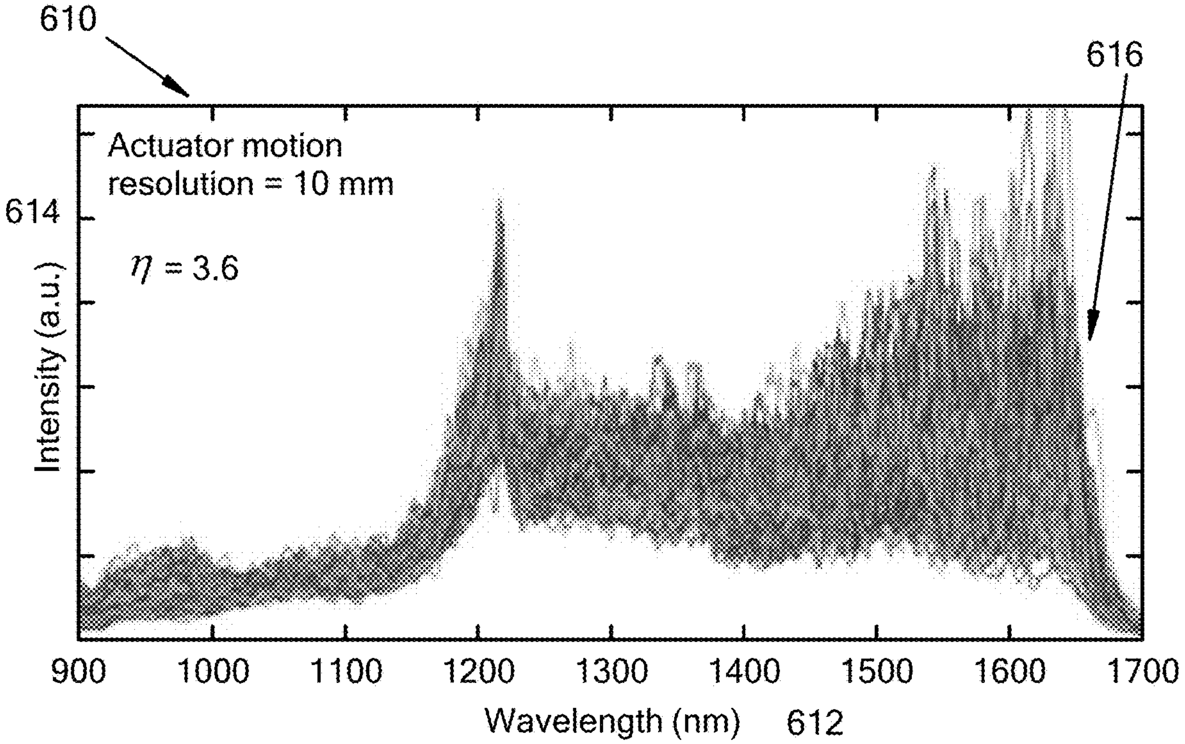
FIG. 8B is a graph of wavelength vs. intensity for a manipulated fiber shaped with an apparatus having a translating unit motion resolution set at 10 mm.
Figure 8C:
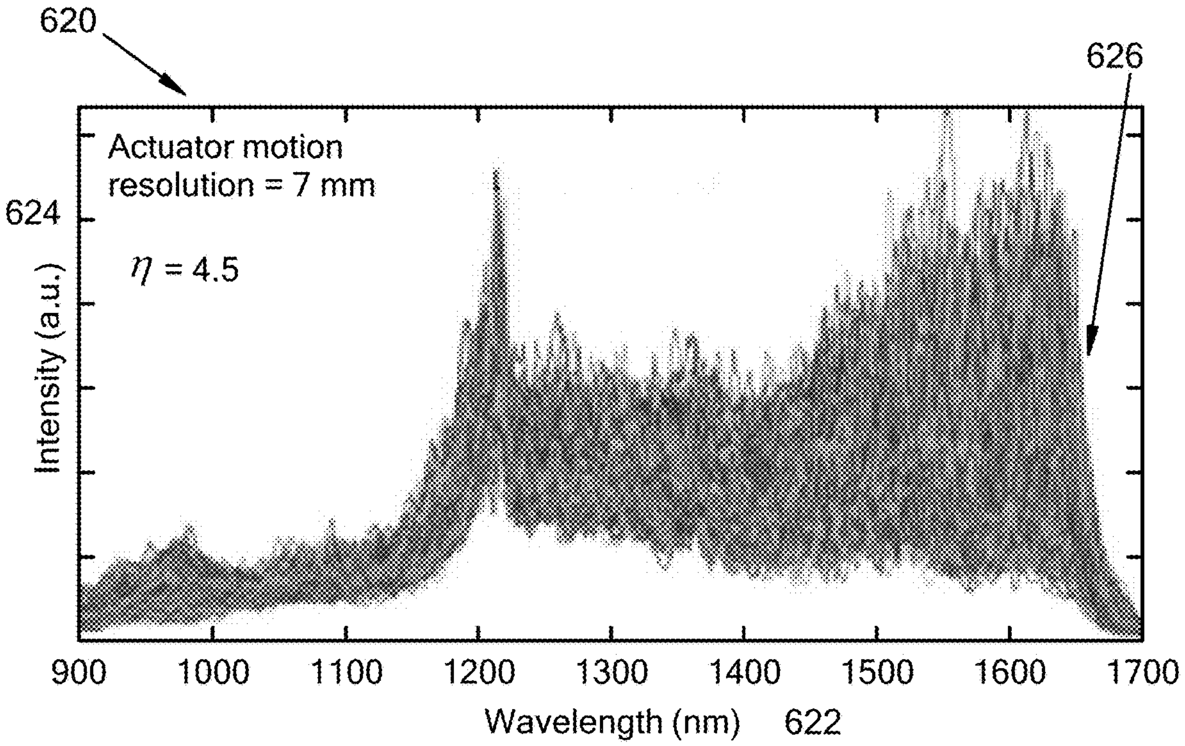
FIG. 8C is a graph of wavelength vs. intensity for a manipulated fiber shaped with an apparatus having a translating unit motion resolution set at 7 mm.
Figure 8D:
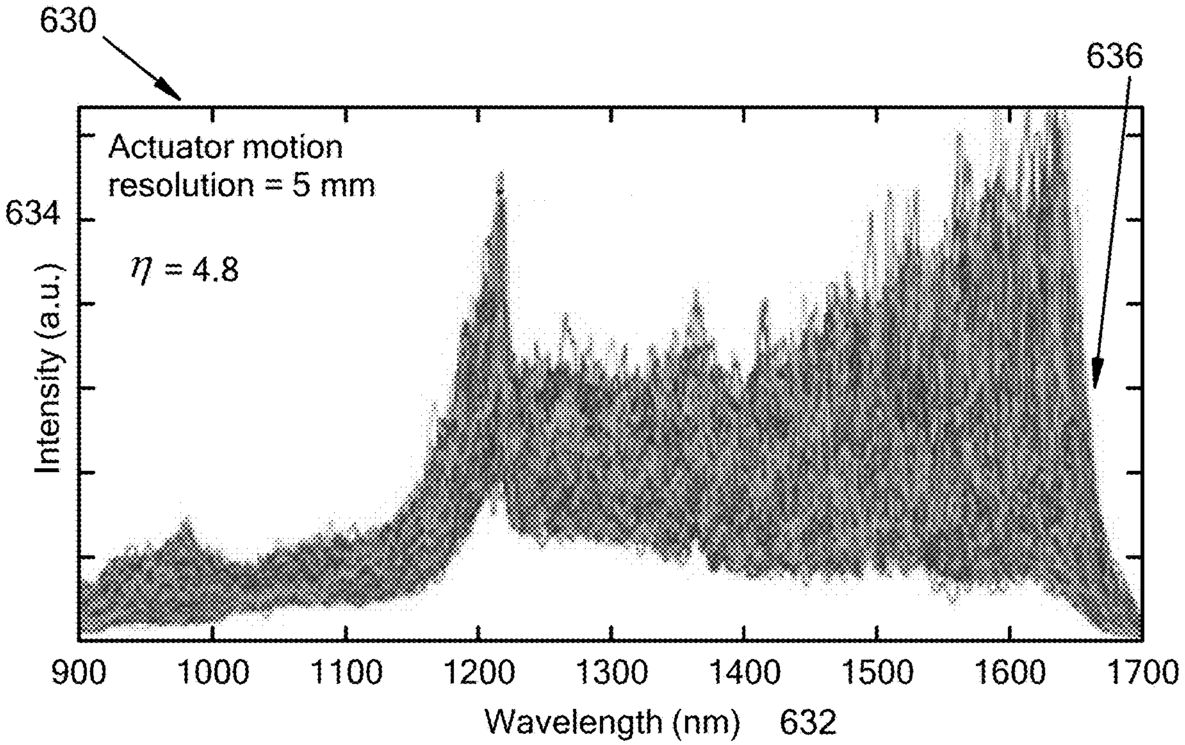
FIG. 8D is a graph of wavelength vs. intensity for a manipulated fiber shaped with an apparatus having a translating unit motion resolution set at 5 mm.

FIGS. 8A-8D are graphs of an output spectra of a manipulated fiber (specifically a SI MMF fiber) shaped with 5 translating units and a displacement range of 20 mm. FIG. 8A is a graph 600 of wavelength (nm) 602 vs. intensity (a.u.) 604. FIG. 8A illustrates an output spectra 606 of a fiber shaped by an apparatus with a translating unit motion resolution set at 20 mm and a η of 2.5. FIG. 8B is a graph 610 of wavelength (nm) 612 vs. intensity (a.u.) 614. FIG. 8B illustrates an output spectra 616 of a fiber shaped by an apparatus with a translating unit motion resolution set at 10 mm and a η of 3.6. FIG. 8C is a graph 620 of wavelength (nm) 622 vs. intensity (a.u.) 624. FIG. 8C illustrates an output spectra 626 of a fiber shaped by an apparatus with a translating unit motion resolution set at 7 mm and a η of 4.5. FIG. 8D is a graph 630 of wavelength (nm) 632 vs. intensity (a.u.) 634. FIG. 8D illustrates an output spectra 636 of a fiber shaped by an apparatus with a translating unit motion resolution set at 5 mm and a η of 4.8. Generally a smaller motion resolution is better. By reducing the motion resolution, the tunability is increased, but it approaches saturation when it is reduced to 5 mm.

There are a number of different parameters involved in optimizing the tunability provided by the apparatus. These parameters include the number of actuators and the total range and resolution of the translating units linear motion. The results indicate tunability is optimized when using 5 translating units, a displacement range of 20 mm, and a translating unit motion resolution of 5 mm. The tunability is defined in the output space of the multimode fiber, such as: spectral; spatial; and temporal tunability. For example, in terms of spectral intensity, spectral tunability is quantified by the average spectral tuning ratio (η). A larger number of translating units increases the tunability, but calls for a longer fiber, which causes undesirable dispersion. The choice of 5 units is based on a balance between the tunability and dispersion. The displacement range indicates the variations of the bending radii the apparatus can induce, with the minimum radii determined by the disk (the half circle). By increasing the displacement range, the tunability is increased, but approaches saturation when it increases to 20 mm. By reducing the motion resolution, which as discussed above a smaller motion resolution is better, the tunability increases, but it approaches saturation when it is reduced to 5 mm.

The devices, systems and methods described herein allow one to take advantage and utilize nonlinear effects of MMFs. Such multimode nonlinear effects are due to high-dimensional spatiotemporal nonlinear dynamics of MMFs and scalability for high power supported by MMFs. Spatiotemporal dynamics and intermodal interactions in MMFs constitute a broad avenue for controlling nonlinear wave propagation, opening up possibilities for applications such as spatiotemporal light control, optical wave turbulence, optical computing, nonlinear frequency generation, and nonlinear optical imaging, sensing, optical sensing, high power optical systems, and any application utilizing multimode nonlinear optics. The concepts, devices, systems and methods described herein may be used to harness temporal degrees of freedom to control nonlinear effects in MMFs at high peak power levels. Thus, light sources (e.g., MMF light sources) provided in accordance with the concepts, devices, systems, and methods described herein have a new multidimensional tunability (i.e., spectral-temporal-spatial properties) and broadband spectral brightness not available in prior art light sources.

Disclosed herein are an apparatus and method for controlling the nonlinear effects by leveraging both the spatial and temporal degrees of freedom through a programmable apparatus that provides access to an even higher-dimensional space of spatiotemporal dynamics and orders of magnitude higher peak power across two-octave broadband in step-index (SI) MMFs. The controlled bends and stresses of the fiber enables simultaneous access to the spatial and temporal degrees of freedom, achieving significantly greater tunability (up to 166-fold spectral energy reallocation, 4-fold temporal compression) and orders of magnitude high peak power (near megawatt on average and 0.15 MW in hard-to-reach regimes, e.g., 1225+/−25 nm) across the two octave range (560 nm to 2200 nm).

The disclosed apparatus and method directly modulates the modal interactions during the pulse temporal evolution using a slip-on 3D-printed fiber shaper, without additional non-fiber modulation layers such as free-space spatial light modulator (SLM) for wavefront shaping in spatial and temporal domains. The all-fiber route to single-stage nonlinear conversion contributes to strong alignment robustness, great long-term stability, and high spectral band energy. The fiber shaper excels in modulating the multimode pulse propagation, which conventional SLMs cannot access easily.

Compared to the conventional GRIN MMFs, the higher damage threshold and the significantly higher tunability of SI MMFs make it a notable part in spatiotemporal control of the high-power multimode nonlinear effects. As a result, the proposed apparatus leads to a fiber source with great tunability in spectral (up to 166-fold reallocation), temporal (up to 4-fold shortening), and spatial domains. Furthermore, the fiber shaper enables combined spectral and temporal tuning, leading to high peak power levels across two-octave spectral bands. For instance, at 750±25 nm, the peak power reached 0.72 MW and 0.15 MW at 1225±25 nm, surpassing the expected regime of operation, which is usually the soliton regime for its inherently high spectral density and short pulse duration.

These performances (1) overcome the bandwidth limitation of existing high-peak-power fiber sources based on soliton formation and (2) demonstrate orders of magnitude higher peak power compared to existing tunable fiber-based broadband sources. These properties could benefit the emerging but technologically demanding applications in optical sensing, imaging, manipulation, and computing, that require light sources with broad spectral coverage, great tunability, ultrashort pulse durations (femtosecond-level), stability, and/or high spectral density of energy and peak power.

The concepts, devices, systems and methods described herein overcome at least the limitations of the difficulty of multidimensional control of the output pulses and the limited broadband brightness of the output pulses. Thus, devices, systems and methods provided in accordance with the concepts described herein may find use in a wide variety of different applications including, but not limited to: high-power fiber lasers, bioimaging, chemical sensing, optical sensing, imaging, manipulation, and optical computing.

Although reference is made herein to particular materials, it is appreciated that other materials having similar functional and/or structural properties may be substituted where appropriate, and that a person having ordinary skill in the art would understand how to select such materials and incorporate them into embodiments of the concepts, techniques, and structures set forth herein without deviating from the scope of those teachings.

Various embodiments of the concepts, systems, devices, structures and techniques sought to be protected are described herein with reference to the related drawings. Alternative embodiments can be devised without departing from the scope of the concepts, systems, devices, structures and techniques described herein. It is noted that various connections and positional relationships (e.g., over, below, adjacent, etc.) are set forth between elements in the following description and in the drawings. These connections and/or positional relationships, unless specified otherwise, can be direct or indirect, and the described concepts, systems, devices, structures and techniques are not intended to be limiting in this respect. Accordingly, a coupling of entities can refer to either a direct or an indirect coupling, and a positional relationship between entities can be a direct or indirect positional relationship.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

The terms "plurality" and "one or more" are understood to include any integer number greater than or equal to one (i.e., one, two, three, four, etc.).

References in the specification to "one embodiment, "an embodiment," "an example embodiment," etc., indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed is:

1. An apparatus, comprising:
a base;
one or more stands disposed on the base, wherein the stands comprise one or more movement mechanisms configured to move the stands; and
one or more translating units disposed on the one or more stands, wherein the one or more translating units comprise a fiber holder,
wherein the one or more translating units are configured to receive and shape a fiber to control spatial degrees of freedom and temporal degrees of freedom of light propagating through the fiber.

2. The apparatus of claim 1, wherein each of the one or more translating units can be moved along an x-axis, a y-axis, or a z-axis to manipulate the fiber.

3. The apparatus of claim 2, wherein each of the one or more of the translating units are positioned differently along the x-axis, the y-axis, or the z-axis compared to each other.

4. The apparatus of claim 2, wherein each of the one or more translating units are positioned the same along the x-axis, the y-axis, and the z-axis compared to each other.

5. The apparatus of claim 1, wherein there are five or seven translating units.

6. The apparatus of claim 1, wherein the one or more translating units are actuators.

7. The apparatus of claim 1, wherein the one or more movement mechanisms comprise one or more of a gear, a motor, or a screw.

8. The apparatus of claim 1, wherein the fiber holder further comprises two disks, wherein each of the disks has a curved surface with a radii that may be adjusted to preset a minimum bend radius applied to the fiber.

9. The apparatus of claim 8, wherein the bend radius of the fiber is about 5 mm to about 10 mm.

10. The apparatus of claim 1, further comprising one or more caps configured to receive and hold the fiber in the apparatus.

11. A method of manipulating a fiber, comprising:
providing a base;
providing one or more stands disposed on the base, wherein the stands comprise one or more movement mechanisms configured to move the stands; and
providing one or more translating units disposed on the one or more stands, wherein the one or more translating units comprise a fiber holder,
wherein the one or more translating units are configured to receive and shape a fiber to control spatial degrees of freedom and temporal degrees of freedom of light propagating through the fiber.

12. The method of claim 11, further comprising moving each of the one or more translating units along an x-axis, a y-axis, or a z-axis to manipulate the fiber.

13. The method of claim 12, further comprising moving each of the one or more of the translating units to a different position along the x-axis, the y-axis, or the z-axis compared to each other.

14. The method of claim 12, further comprising moving each of the one or more of the translating units to the same position along the x-axis, the y-axis, or the z-axis compared to each other.

15. The method of claim 11, wherein there are five or seven translating units.

16. The method of claim 11, wherein the one or more translating units are actuators.

17. The method of claim 11, wherein the one or more movement mechanisms comprise one or more of a gear, a motor, or a screw.

18. The method of claim 11, wherein the fiber holder further comprises two disks, wherein each of the disks has a curved surface with a radii that may be adjusted to preset a minimum bend radius applied to the fiber.

19. The method of claim 18, wherein the bend radius of the fiber is about 5 mm to about 10 mm.

20. The method of claim 11, further comprising providing one or more caps configured to receive and hold the fiber.

* * * * *